United States Patent
Park et al.

(10) Patent No.: US 10,034,244 B2
(45) Date of Patent: Jul. 24, 2018

(54) METHOD AND APPARATUS FOR TRANSMITTING AND RECEIVING PERIODIC DATA ON BASIS OF POWER SAVE MODE IN WIRELESS LAN

(71) Applicant: LG ELECTRONICS INC., Seoul (KR)

(72) Inventors: Giwon Park, Seoul (KR); Kiseon Ryu, Seoul (KR); Jeongki Kim, Seoul (KR); Hangyu Cho, Seoul (KR); Suhwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/319,350

(22) PCT Filed: Jun. 10, 2015

(86) PCT No.: PCT/KR2015/005845
§ 371 (c)(1),
(2) Date: Dec. 15, 2016

(87) PCT Pub. No.: WO2015/194787
PCT Pub. Date: Dec. 23, 2015

(65) Prior Publication Data
US 2017/0135040 A1    May 11, 2017

Related U.S. Application Data

(60) Provisional application No. 62/014,118, filed on Jun. 19, 2014.

(51) Int. Cl.
*H04W 52/02*    (2009.01)
*H04W 72/04*    (2009.01)
(Continued)

(52) U.S. Cl.
CPC ....... *H04W 52/0225* (2013.01); *H04W 72/04* (2013.01); *H04W 72/12* (2013.01); *H04W 84/12* (2013.01)

(58) Field of Classification Search
CPC . H04W 52/02; H04W 52/0225; H04W 72/04; H04W 72/12; H04W 84/12; Y02B 60/50
See application file for complete search history.

(56) References Cited

U.S. PATENT DOCUMENTS 9,203,586 B2 * 12/2015 You .......................... H04B 7/04
2008/0232287 A1    9/2008 Shao et al.
(Continued)

FOREIGN PATENT DOCUMENTS

KR    1020140068054 A    6/2014

OTHER PUBLICATIONS

"IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications", IEEE Draft P802.11-REVmb™/D12, Nov. 2011, section 8.3.3.2., pp. 463-467 (6 pages provided).
(Continued)

*Primary Examiner* — Tri H Phan
(74) *Attorney, Agent, or Firm* — Lee, Hong, Degerman, Kang & Waimey

(57) ABSTRACT

Disclosed are a method and apparatus for transmitting and receiving periodic data on the basis of a power save mode in a wireless LAN. The method for transmitting and receiving periodic data in a wireless LAN comprises: a step for receiving, by an access point (AP), each of a plurality of uplink frames including periodic uplink/downlink transmission fields, from each of a plurality of stations (STA); a step for determining, by the AP, a downlink resource for each of
(Continued)

the plurality of periodic downlink frames to be transmitted to each of the plurality of STAs, and an uplink resource for each of the plurality of periodic uplink frames to be transmitted by each of the plurality of STAs; and a step for transmitting, by the AP, a multi-user (MU) scheduling frame including information on the downlink resource and information on the uplink resource, to each of the plurality of STAs.

10 Claims, 17 Drawing Sheets

(51) Int. Cl.
*H04W 72/12* (2009.01)
*H04W 84/12* (2009.01)

(56) References Cited

U.S. PATENT DOCUMENTS

| | | | |
|---|---|---|---|
| 2011/0044228 | A1 | 2/2011 | Song et al. |
| 2011/0134821 | A1 | 6/2011 | Kakani |
| 2012/0002568 | A1* | 1/2012 | Tiirola .............. H04L 1/0026 370/252 |
| 2013/0188567 | A1 | 7/2013 | Wang et al. |
| 2014/0313957 | A1 | 10/2014 | Bao et al. |
| 2016/0242195 | A1* | 8/2016 | Kwon ............... H04W 72/121 |
| 2017/0086212 | A1* | 3/2017 | Kim ....................... H04L 27/26 |
| 2017/0127440 | A1* | 5/2017 | Chun ............... H04W 72/1284 |
| 2017/0127451 | A1* | 5/2017 | Chun ............... H04W 74/0825 |
| 2017/0273019 | A1* | 9/2017 | Park ............... H04W 52/0209 |
| 2017/0273112 | A1* | 9/2017 | Lou ................. H04W 74/0825 |

OTHER PUBLICATIONS

"IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications", IEEE Draft P802.11-REVmb™/D12, Nov. 2011, section 8.5.8.3., pp. 799-800 (3 pages provided).
"IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications", IEEE Draft P802.11-REVmb™/D12, Nov. 2011, section 8.3.3.9., pp. 473-474 (3 pages provided).
"IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications", IEEE Draft P802.11-REVmb™/D12, Nov. 2011, section 8.3.3.10., pp. 474-477 (5 pages provided).
"IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications", IEEE Draft P802.11-REVmb™/D12, Nov. 2011, section 8.3.3.11., pp. 478-479 (3 pages provided).
"IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications", IEEE Draft P802.11-REVmb™/D12, Nov. 2011, section 8.3.3.5.-8.3.3.6., pp. 467-468 (3 pages provided).
"IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications", IEEE Draft P802.11-REVmb™/D12, Nov. 2011, section 8.4.2.29., pp. 611-615 (6 pages provided).
"IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications", IEEE Draft P802.11-REVmb™/D12, Nov. 2011, section 8.2.4.1., pp. 425-429 (6 pages provided).
PCT International Application No. PCT/KR2015/005845, International Search Report dated Sep. 15, 2015, 2 pages.

* cited by examiner

FIG. 1
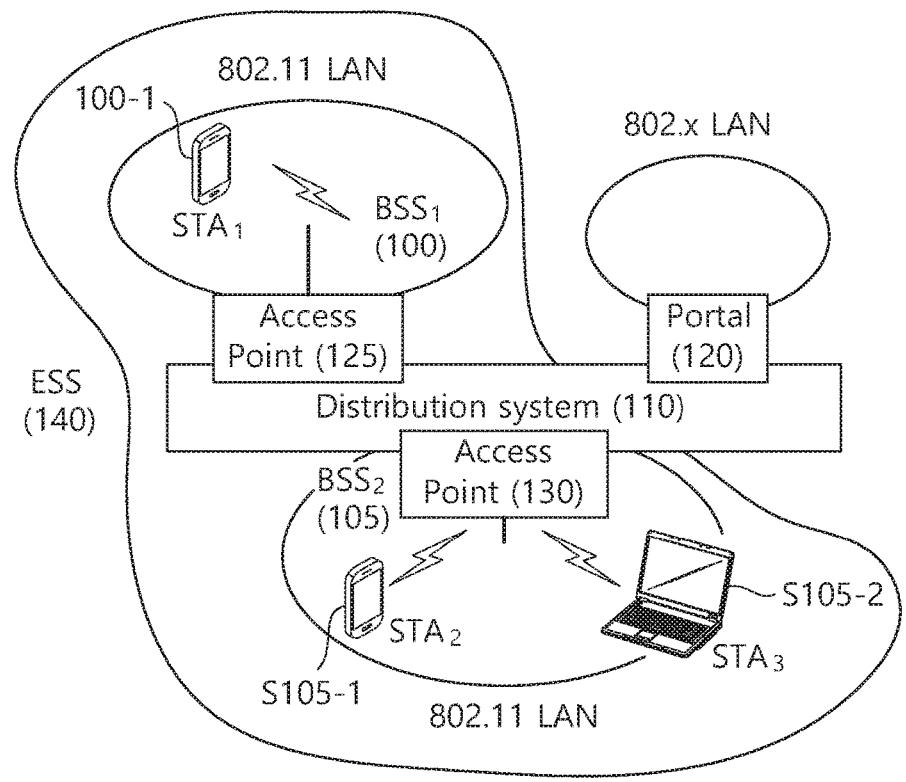
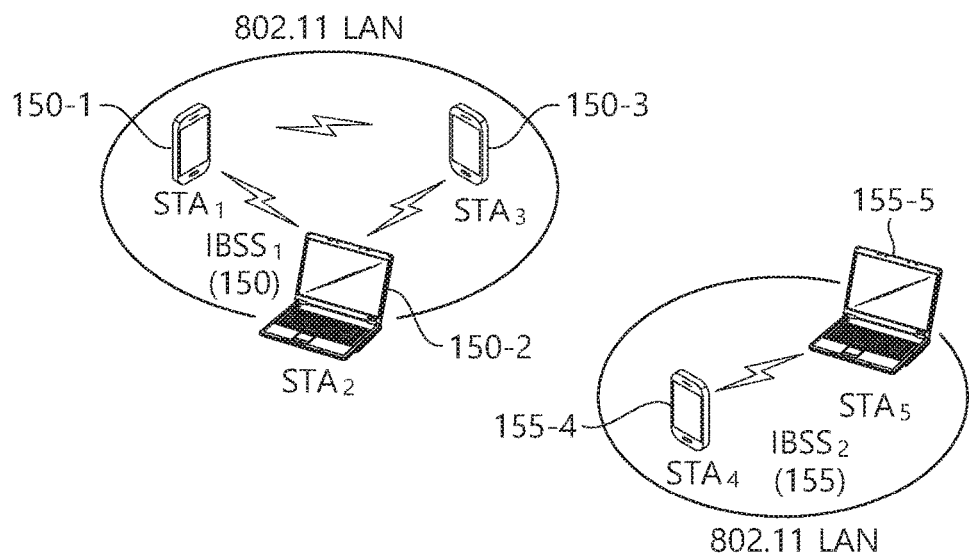

METHOD AND APPARATUS FOR TRANSMITTING AND RECEIVING PERIODIC DATA ON BASIS OF POWER SAVE MODE IN WIRELESS LAN

CROSS-REFERENCE TO RELATED APPLICATIONS

This application is the National Stage filing under 35 U.S.C. 371 of International Application No. PCT/KR2015/005845, filed on Jun. 10, 2015, which claims the benefit of U.S. Provisional Application No. 62/014,118 filed on Jun. 19, 2014, the contents of which are all hereby incorporated by reference herein in their entirety.

BACKGROUND OF THE INVENTION

Field of the Invention

The present invention relates to wireless communication and, most particularly, to a method and apparatus for transmitting and receiving periodic data on the basis of a power save mode in a wireless local area network (LAN).

Related Art

An IEEE 802.11 standard provides a power save mechanism (or power save mode) to increase the lifespan of a wireless local area network (WLAN) station (STA). The STA operating based on the power save mode may operate in an awake state or a doze state for power saving. The awake state is a state which enables a normal operation of the STA such as frame transmission or reception, channel scanning, etc. On the other hand, the doze state is a state in which power consumption is extremely reduced and thus frame transmission or reception and channel scanning are impossible. In a case where the STA usually operates in the power save mode, the STA is in the doze state and, when necessary, transitions to the awake state, thereby reducing power consumption.

If the STA operates for a long time in the doze state, power consumption of the STA is reduced. Therefore, the lifespan of the STA may be increased. However, frame transmission or reception is impossible in the doze state. Therefore, the STA cannot stay for a long time in the doze state. If a pending frame is generated in the doze state, the STA may transition to the awake state to transmit the frame to an access point (AP). However, if the STA is in the doze state and a pending frame to be transmitted to the STA exists in the AP, the STA cannot receive the pending frame from the AP, and cannot know that the pending frame exists in the AP. Therefore, the STA may acquire information regarding the presence/absence of the pending frame in the AP, and may operate by periodically transitioning to the awake mode in order to receive the pending frame in the AP.

The AP may acquire information regarding awake mode operating timing of the STA, and may transmit the information regarding the presence of the pending frame in the AP according to the awake mode operating timing of the STA.

More specifically, in order to receive information regarding the presence/absence of a frame to be received from the AP, the STA may periodically transition from the doze state to the awake state to receive a beacon frame. The AP may report the presence/absence of a frame to be transmitted to each STA on the basis of a traffic indication map (TIM) included in the beacon frame. The TIM is used to report the presence of a unicast frame to be transmitted to the STA, and a delivery traffic indication map (DTIM) may be used to report the presence of a multicast frame/broadcast frame to be transmitted to the STA.

SUMMARY OF THE INVENTION

Technical Objects

An object of the present invention is to provide a method for receiving and transmitting periodic data on the basis of power of a power save mode in a wireless LAN.

Another object of the present invention is to provide an apparatus performing a method for receiving and transmitting periodic data on the basis of power of a power save mode in a wireless LAN.

Technical Solutions

In order to achieve the above-described technical object of the present invention, according to an aspect of the present invention, a method for transmitting and receiving periodic data in a wireless LAN may include receiving, by an access point (AP), each of a plurality of uplink frames including a periodic uplink/downlink transmission field from each of a plurality of stations (STAs), determining, by the AP, a downlink resource for each of a plurality of periodic downlink frames that are to be transmitted to each of the plurality of STAs and an uplink resource for each of a plurality of periodic uplink frames that are to be transmitted by each of the plurality of STAs, transmitting, by the AP, a multi-user (MU) scheduling frame including information on the downlink resource and information for the uplink resource, transmitting, by the AP, each of the plurality of periodic downlink frames to each of the plurality of STAs through the downlink resources based on the MU scheduling frame within an overlapping time resource, and receiving, by the AP, each of the plurality of periodic uplink frames from each of the plurality of STAs through the uplink resources based on the MU scheduling frame within an overlapping time resource, wherein the periodic uplink/downlink transmission field includes information requesting transmission of periodic uplink data and reception of periodic downlink data.

In order to achieve the above-described technical object of the present invention, according to another aspect of the present invention, an access point (AP) transmitting and receiving periodic data in a wireless LAN may include a radio frequency (RF) unit configured to transmit or receive radio signal, and a processor operatively connected to the RF unit, wherein the processor may be configured to receive each of a plurality of uplink frames including a periodic uplink/downlink transmission field from each of a plurality of stations (STAs), to determine a downlink resource for each of a plurality of periodic downlink frames that are to be transmitted to each of the plurality of STAs and an uplink resource for each of a plurality of periodic uplink frames that are to be transmitted by each of the plurality of STAs, to transmit multi-user (MU) scheduling frame including information on the downlink resource and information for the uplink resource, to transmit each of the plurality of periodic downlink frames to each of the plurality of STAs through the downlink resources based on the MU scheduling frame within an overlapping time resource, and to receive each of the plurality of periodic uplink frames from each of the plurality of STAs through the uplink resources based on the MU scheduling frame within an overlapping time resource, wherein the periodic uplink/downlink transmission field includes information requesting transmission of periodic uplink data and reception of periodic downlink data.

Effects of the Invention

The power of a plurality of STAs performing the transmission and reception of periodic data may be saved.

BRIEF DESCRIPTION OF THE DRAWINGS

FIG. 1 is a conceptual view illustrating the structure of a wireless local area network (WLAN).

DESCRIPTION OF EXEMPLARY EMBODIMENTS

Figure 2:
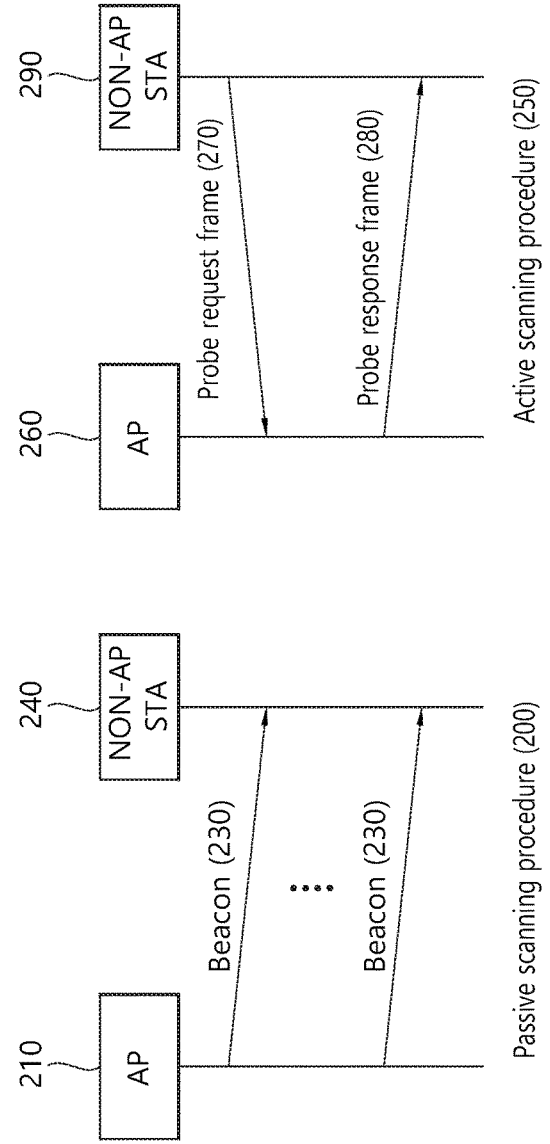
FIG. 2 is a conceptual view illustrating a scanning method in a wireless LAN.

FIG. 1 is a conceptual view illustrating the structure of a wireless local area network (WLAN).

An upper part of FIG. 1 shows the structure of the institute of electrical and electronic engineers (IEEE) 802.11 infrastructure network.

Referring to the upper part of FIG. 1, the WLAN system may include one or more basic service sets (BSSs) 100 and 105. The BSS 100 or 105 is a set of an access point (AP) such as AP 125 and a station (STA) such as STA1 100-1 that may successfully sync with each other to communicate with each other and is not the concept to indicate a particular area. The BSS 105 may include one AP 130 and one or more STAs 105-1 and 105-2 connectable to the AP 130.

The infrastructure BSS may include at least one STA, APs 125 and 130 providing a distribution service, and a distribution system (DS) 110 connecting multiple APs.

The distribution system 110 may implement an extended service set (ESS) 140 by connecting a number of BSSs 100 and 105. The ESS 140 may be used as a term to denote one network configured of one or more APs 125 and 130 connected via the distribution system 110. The APs included in one ESS 140 may have the same service set identification (SSID).

The portal 120 may function as a bridge that performs connection of the WLAN network (IEEE 802.11) with other network (for example, 802.X).

In the infrastructure network as shown in the upper part of FIG. 1, a network between the APs 125 and 130 and a network between the APs 125 and 130 and the STAs 100-1, 105-1, and 105-2 may be implemented. However, without the APs 125 and 130, a network may be established between the STAs to perform communication. The network that is established between the STAs without the APs 125 and 130 to perform communication is defined as an ad-hoc network or an independent basic service set (BSS).

A lower part of FIG. 1 is a concept view illustrating an independent BSS.

Referring to the lower part of FIG. 1, the independent BSS (IBSS) is a BSS operating in ad-hoc mode. The IBSS does not include an AP, so that it lacks a centralized management entity. In other words, in the IBSS, the STAs 150-1, 150-2, 150-3, 155-4 and 155-5 are managed in a distributed manner. In the IBSS, all of the STAs 150-1, 150-2, 150-3, 155-4 and 155-5 may be mobile STAs, and access to the distribution system is not allowed so that the IBSS forms a self-contained network.

The STA is some functional medium that includes a medium access control (MAC) following the Institute of Electrical and Electronics Engineers (IEEE) 802.11 standards and that includes a physical layer interface for radio media, and the term "STA" may, in its definition, include both an AP and a non-AP station (STA).

The STA may be referred to by various terms such as mobile terminal, wireless device, wireless transmit/receive unit (WTRU), user equipment (UE), mobile station (MS), mobile subscriber unit, or simply referred to as a user.

Hereinafter, in an embodiment of the present invention, data (or a frame) to be transmitted from the AP to the STA may be expressed by the term 'downlink data (or a downlink frame)', and data (or a frame) to be transmitted from the STA to the AP may be expressed by the term 'uplink data (or an uplink frame)'. In addition, transmission from the AP to the STA may be expressed by the term 'downlink transmission', and transmission from the STA to the AP may be expressed by the term 'uplink transmission'.

FIG. 2 is a conceptual view illustrating a scanning method in a wireless LAN.

Referring to FIG. 2, the scanning method may be divided into passive scanning 200 and active scanning 250.

Referring to the left side of FIG. 2, passive scanning 200 may be performed by a beacon frame 230, which is periodically broadcasted by an AP 210. The AP 210 of the wireless LAN broadcasts a beacon frame 230 to a non-AP STA 240 at each specific interval (e.g., 100 msec). Information on the current network may be included in the beacon frame 230. By receiving the beacon frame 230 that is periodically broadcasted, the non-AP STA 240 receives the network information and may perform scanning on the AP 240, which will be performing the authentication/association procedure, and the channel.

The passive scanning method 200 may be performed by simply receiving the beacon frame 230 that is being transmitted from the AP 210 without requiring the non-AP STA 240 to transmit any frames. Therefore, the passive scanning 200 is advantageous in that the overall overhead, which occurs due to the transmission/reception of data within the network, is small. However, since the scanning process can only be performed manually in proportion to the cycle of the beacon frame 230, passive scanning 200 is disadvantageous in that the time consumed for performing the scanning process is relatively longer in comparison with the active scanning method. Detailed description on the beacon frame is disclosed in 8.3.3.2 beacon frame of the IEEE Draft P802.11-REVmb™/D12, November 2011 'IEEE Standard for Information Technology Telecommunications and information exchange between systems—Local and metropolitan area networks—Specific requirements Part 11: Wireless LAN Medium Access Control (MAC) and Physical Layer (PHY) Specifications (hereinafter referred to as IEEE 802.11)', which was disclosed in November 2011. In IEEE 802.11 ai, a beacon frame of another format may be additionally used, and such beacon frame may be referred to as a fast initial link setup (FILS) beacon frame. Additionally, a measurement pilot frame may be used in the scanning procedure as a frame including only a portion of the information of the beacon frame. The measurement pilot frame is disclosed in the IEEE 802.11 8.5.8.3 measurement pilot format.

Referring to the right side of FIG. 2, in active scanning 250, a non-AP STA 290 may transmit a probe request frame 270 to an AP 260, thereby being capable of actively performing a scanning procedure.

After receiving the probe request frame 270 from the non-AP STA 290, the AP 260 waits for a random period of time in order to prevent frame collision. And, then, the AP 260 may include network information to a probe response frame 280 and may transmit the probe response frame 280 to the non-AP STA 290. The non-AP STA 290 may obtain the network information based on the received probe response frame 280 and may then stop the scanning procedure.

In case of active scanning 250, since the non-AP STA 290 actively performs scanning, it is advantageous in that the time consumed for performing the scanning procedure is short. However, since the non-AP STA 290 is required to transmit the probe request frame 270, it is disadvantageous in that the network overhead increases for the transmission and reception of the frames. The probe request frame 270 is disclosed in IEEE 802.11 8.3.3.9, and the probe response frame 280 is disclosed in IEEE 802.11 8.3.3.10.

Once the scanning is completed, the AP and the non-AP STA may perform the authentication and association procedures.

Figure 3:
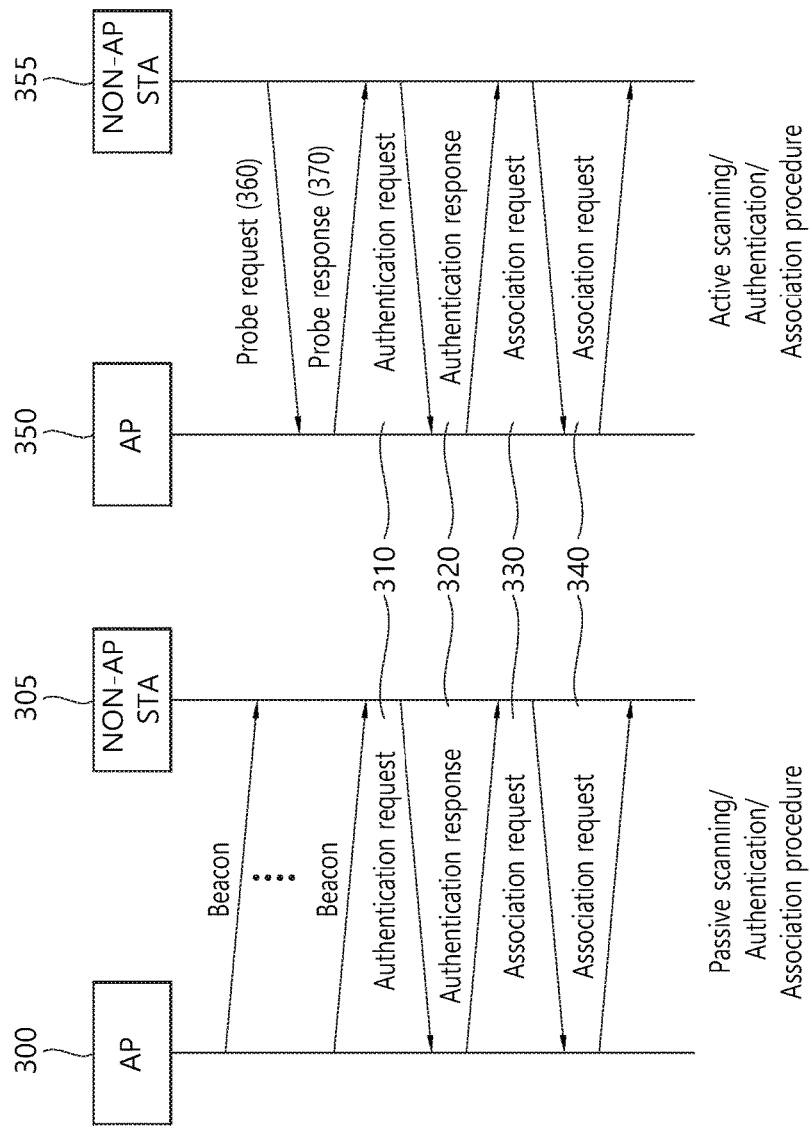
FIG. 3 is a conceptual view illustrating an authentication procedure and an association procedure being performed after the scanning procedure of the AP and the STA.

FIG. 3 is a conceptual view illustrating an authentication procedure and an association procedure being performed after the scanning procedure of the AP and the STA.

Referring to FIG. 3, after performing the passive/active scanning procedure, the authentication procedure and the association procedure may be performed with one of the scanned APs.

The authentication and association procedures may be performed, for example, through 2-way handshaking. The left side of FIG. 3 is a conceptual view showing the authentication and association procedures after performing passive scanning, and the right side of FIG. 3 is a conceptual view showing the authentication and association procedures after performing scanning.

Regardless of whether the active scanning method or the passive scanning method has been used, the authentication procedure and the association procedure may be equally performed by exchanging an authentication request frame 310/authentication response frame 320 and an association request frame 330/association response frame 340 between the AP 300 and 350 and the non-AP STA 305 and 355.

During the authentication procedure, the non-AP STA 305 and 355 may transmit an authentication request frame 310 to the AP 300 and 350. As a response to the authentication request frame 310, the AP 300 and 350 may transmit an authentication response frame 320 to the non-AP STA 305 and 355. Detailed description on the authentication frame format is disclosed in IEEE 802.11 8.3.3.11.

During the association procedure, the non-AP STA 305 and 355 may transmit an association request frame 330 to the AP 300 and 350. And, as a response to the association request frame 330, the AP 300 and 350 may transmit an association response frame 340 to the non-AP STA 305 and 355. Information related to the ability of the non-AP STA 305 and 355 is included in the association request frame 330, which is transmitted to the AP. Based on the capability information of the non-AP STA 305 and 355, the AP 300 and 350 may determine whether or not the non-AP STA 305 and 355 can be supported. In case the non-AP STA 305 and 355 can be supported, the AP 300 and 350 may transmit the association response frame 340 to the non-AP STA 305 and 355. The association response frame 340 may include information on whether or not the association request frame 330 is accepted and the corresponding reason and capability information of the non-AP STA that can be supported by the corresponding AP. Detailed description on the association frame format is disclosed in IEEE 802.11 8.3.3.5/8.3.3.6.

After the association procedure is carried out between the AP and the non-AP STA, normal transmission and reception of data may be performed between the AP and the non-AP STA. In case the association procedure between the AP and the non-AP STA has failed, based on the reason why the association procedure has failed, the association procedure may be performed once again with the same AP, or a new association procedure may be performed with another AP.

In case the STA is associated with the AP, the STA may be allocated with an association ID (association identifier, AID) from the AP. The AID that is allocated to the STA may correspond to a unique value within one BSS, and the current AID value may correspond to any one of the values within the range of 1~2007. Since 14 bits are allocated for the AID, although a maximum of 16383 bits may be used for the AID value, values within the range of 2008~16383 are reserved.

In the IEEE 802.11 standard, in order to extend the life span of STAs of a wireless LAN, a power save mechanism (Power save Mode) is provided.

An STA, which operates based on the Power Save mode, may reduce its power consumption by operating while shifting to and from an awake state and a doze state, thereby extending the operation life span of the STA. An STA, which operates based on an Active mode, may maintain the awake state.

An STA being in the awake state may perform normal operations, such as transmission or reception of frames, channel scanning, and so on. Conversely, an STA being in the doze state does not perform any transmission or reception of frames and does not perform any channel scanning in order to reduce power consumption. An STA operating in the Power Save mode maintains the doze state in order to reduce power consumption, and, then, when required, the corresponding STA may perform a shift (or transition) to the awake modes so as to carry out communication with the AP.

As the duration time for maintaining the doze state of the STA becomes more extended, the power consumption of the STA may be required, and the life span of the STA may be extended. However, in the doze state, it is impossible for the STA to perform the transmission or reception of frames. if a pending uplink frame exists in the STA, the STA, which was operating in the Power Save mode, may shift from a doze state to an active state, or, if a pending uplink frame exists in the STA, the STA, which was operating in the Power Save mode, may shift from a Power Save mode to an Active mode, thereby being capable of transmitting an uplink frame to the AP. Conversely, in case a pending frame that is to be transmitted to the STA, which is being operated in the doze state, exists in the AP, the AP cannot transmit the pending frame to the STA before the shift of the STA to the Awake mode.

Therefore, the STA operating in the Power Save mode may occasionally shift from the doze state to the awake state and may receive information on whether or not any pending frame for the STA exists from the AP. Considering a shifting time of the STA operating in the Power Save mode to the awake state, the AP may transmit information on the presence of pending downlink data for the STA to the STA.

More specifically, in order to receive information on the presence or absence of a pending frame for the STA, the STA operating in the Power Save mode periodically shifts from the doze state to the awake state, thereby being capable of receiving the beacon frame. As a frame being used for the passive scanning of the STA, the beacon frame may include information on the capability of the AP. The AP may periodically (e.g., 100 msec) transmit a beacon frame to the STA.

Figure 4:
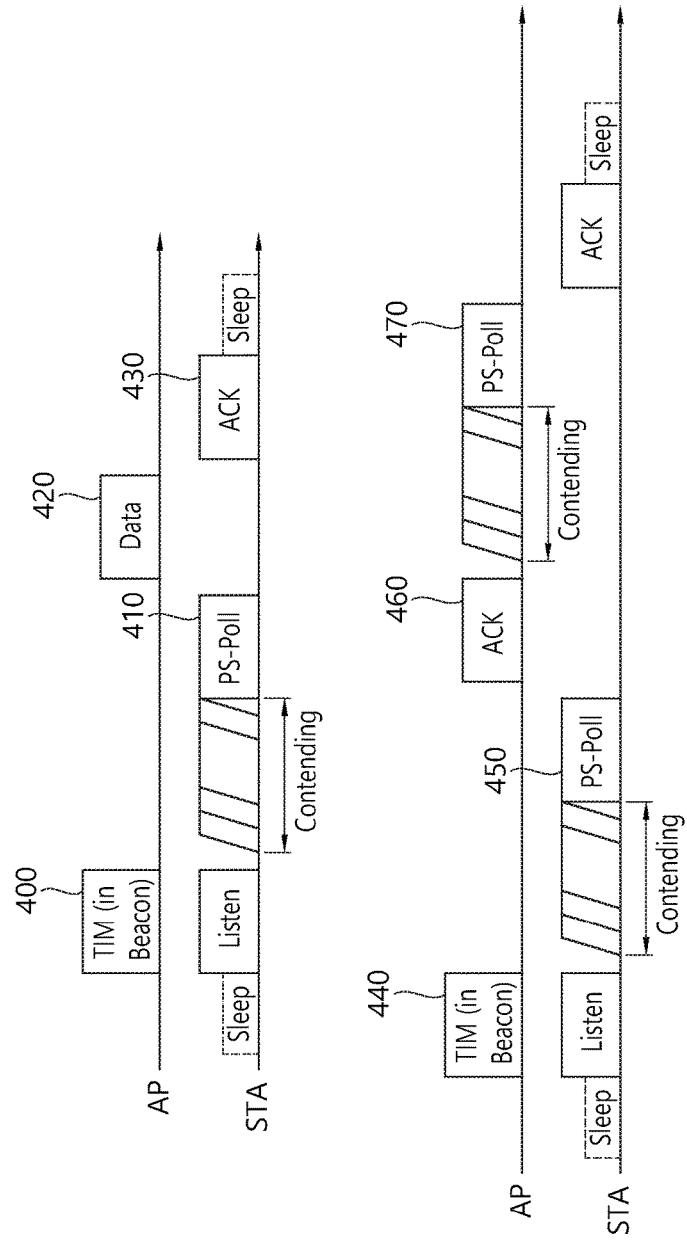
FIG. 4 is a conceptual view illustrating a power save method based on a beacon frame.

FIG. 4 is a conceptual view illustrating a power save method based on a beacon frame.

Referring to FIG. 4, the AP may periodically transmit a beacon frame, and, while considering the transmission timing of the beacon frame, the STA operating in the Power Save mode may periodically shift from the doze state to the awake state, thereby being capable of receiving the beacon frame. The beacon frame based Power Saving method may also be expressed by using the term TIM-based power save mode.

The beacon frame may include a traffic indication map (TIM) element. The TIM element may be used for transmitting the information on the pending downlink data for the STA to the AP. For example, the TIM element may include information on the pending downlink data for the STA based on a bitmap. The TIM element may be identified as a TIM or DTIM (delivery TIM). The TIM may indicate the presence of pending downlink data that are to be transmitted to the STA based on unicast. The DTIM may indicate the presence of pending downlink data that are to be transmitted based on broadcast/multicast.

The upper portion of FIG. 4 discloses a method of an AP for transmitting a downlink frame based on an immediate response to a power save (PS)-poll frame.

Referring to the upper portion of the FIG. 4, the STA may receive information on the presence of pending downlink data for the STA from the AP based on the TIM of the beacon frame 400. The STA may transmit a PS-poll frame 410 to the AP. The AP may receive the PS-poll frame 410 from the STA and may then transmit a downlink frame 420 to the STA as an immediate response to the received PS-poll frame 410. The immediate response to the PS-poll frame of the AP may be performed after a short interframe space (SIFS) after receiving the PS-poll frame.

The STA may transmit an ACK frame 430 as a response to the downlink frame. In case the transmission of the pending downlink data for the STA is ended, the STA operating in the Power Save mode may perform shifting (or transition) back to the doze state.

The lower portion of FIG. 4 discloses a method of an AP for transmitting a downlink frame based on a deferred response to a PS-poll frame.

Referring to the lower portion of the FIG. 4, the STA may receive information on the presence of pending downlink data for the STA from the AP based on the TIM of the beacon frame 440. The STA may transmit a PS-poll frame 450 to the AP. The AP may receive the PS-poll frame 450 from the STA and may then transmit an ACK frame 460 to the STA as a response to the received PS-poll frame 450. After the transmission of the ACK frame 460, the AP may transmit a downlink frame 470 including the pending downlink data to the STA. After receiving the ACK frame 460, the STA may monitor the downlink frame 470 being transmitted by the AP to the STA.

Similarly, in case the transmission of the pending downlink data for the STA is ended, the STA operating in the Power Save mode may perform shifting (or transition) from the awake state back to the doze state.

Figure 5:
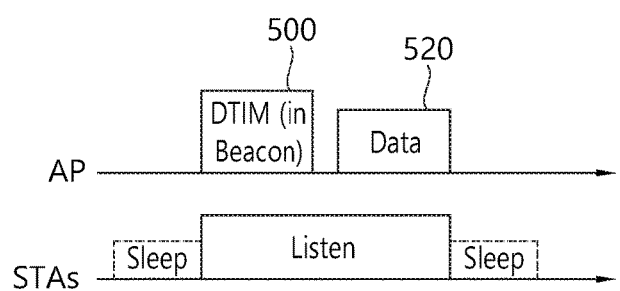
FIG. 5 is a conceptual view illustrating a power save method based on a beacon frame.

FIG. 5 is a conceptual view illustrating a power save method based on a beacon frame.

FIG. 5 discloses a case when a DTIM is delivered through a beacon frame 500. The beacon frame 500 may include a DTIM. As described above, the DTIM may indicate the presence of pending downlink data that are to be transmitted based on broadcast/multicast.

Referring to FIG. 5, the AP may transmit a beacon frame 500 including a DTIM to the STA. After receiving the beacon frame 500 including the DTIM, the STA may maintain the awake state without transmitting the PS-poll frame and may monitor the transmission of the downlink frame 520. The AP may transmit the downlink frame 520 to the STA by using the multicast method or the broadcast method.

An AP operating in a wireless LAN system may transmit data to each of a plurality of STAs by using the same time resource. If the transmission from the AP to the STA is referred to as a downlink transmission, the transmission of such AP may be expressed by using the term downlink multi-user transmission (DL MU transmission) (or downlink multiple user transmission). Conversely, a downlink single user (DL SU) transmission may indicate a downlink transmission from the AP to one STA within the entire transmitting resource.

In the legacy wireless LAN system, the AP was capable of performing DL MU transmission based on multiple input multiple output (MU MIMO), and such transmission may be expressed by using the term DL MU MIMO transmission. In the exemplary embodiment of the present invention, the AP may perform DL MU transmission based on an orthogonal frequency division multiplexing access (OFDMA), and such transmission may be expressed by using the term DL MU OFDMA transmission. In case the DL MU OFDMA transmission is performed, the AP may transmit downlink data (or downlink frames, downlink PPDUs) to each of the multiple STAs through each of the multiple frequency resources within an overlapped time resource. The DL MU OFDMA transmission may be used along with the DL MU MIMO transmission. For example, a DL MU MIMO transmission that is based on a plurality of space-time streams (or spatial streams) within a specific subband (or sub channel), which is allocated for the DL MU OFDMA transmission.

Each of the PPDU, frame, and data that are transmitted via downlink transmission may be respectively expressed by using the terms downlink PPDU, downlink frame, and downlink data. The PPDU may correspond to a data unit including a PPDU header and a physical layer service data unit (PSDU) (or MAC protocol data unit (MPDU) or MAC payload). The PPDU header may include a PHY header and a PHY preamble. And, the PSDU (or MPDU) may correspond to a data unit including a frame or may correspond to a frame.

Conversely, a transmission from an STA to the AP may be referred to as an uplink transmission, and the transmission of data from multiple STAs to the AP within the same time resource may be expressed by using the term uplink multi-user transmission (or uplink multiple user transmission). A UL SU transmission may indicate an uplink transmission from one STA to one AP within the entire transmission resource. Unlike the legacy wireless LAN system, which only authorizes UL SU transmission, in the wireless LAN system according to the exemplary embodiment of the present invention, the UL MU transmission may also be supported. Each of the PPDU, frame, and data that are transmitted via uplink transmission may be respectively expressed by using the terms uplink PPDU, uplink frame, and uplink data. The uplink transmission that is performed by each of the multiple STAs may be performed within a frequency domain or a spatial domain.

In case the uplink transmission that is performed by each of the multiple STAs is performed within the frequency domain, different frequency resources respective to each of the multiple STAs may be allocated as uplink transmission resources based on OFDMA. Each of the multiple STAs may transmit an uplink frame to the AP by using the respective frequency resources allocated to each STA. Such transmission method using different frequency resources may also be expressed by using the term UL MU OFDMA transmission method.

In case the uplink transmission that is performed by each of the multiple STAs is performed within the spatial domain, different space time streams (or spatial streams) are allocated to each of the multiple STAs, and each of the multiple STAs may transmit an uplink frame to the AP by using different space time streams. Such as transmission method using different spatial streams may also be expressed by using the term UL MU MIMO transmission method.

A UL MU OFDMA transmission may be performed along with a UL MU MIMO transmission. For example, a UL MU MIMO transmission that is based on a plurality of space-time streams (or spatial streams) within a specific subband (or sub channel), which is allocated for the UL MU OFDMA transmission.

Hereinafter, the exemplary embodiment of the present invention discloses a method for performing periodic DL MU transmission from the AP to a plurality of STAs and periodic UL MU transmission from a plurality of STAs to the AP. Services having periodic traffic specification (e.g., voice over internet protocol (VoIP)) may be provided between a plurality of STAs operating in the power save mode and the AP based on the method for performing periodic DL MU transmission from the AP to a plurality of STAs and periodic UL MU transmission from a plurality of STAs to the AP according to the exemplary embodiment of the present invention. A plurality of downlink frames being transmitted based on the DL MU transmission may be carried (or delivered) based on a DL MU PPDU format, which will be described later on in more detail, and a plurality uplink frames being transmitted based on the UL MU transmission may be carried (or delivered) based on a UL MU PPDU format, which will be described later on in more detail.

Figure 6:
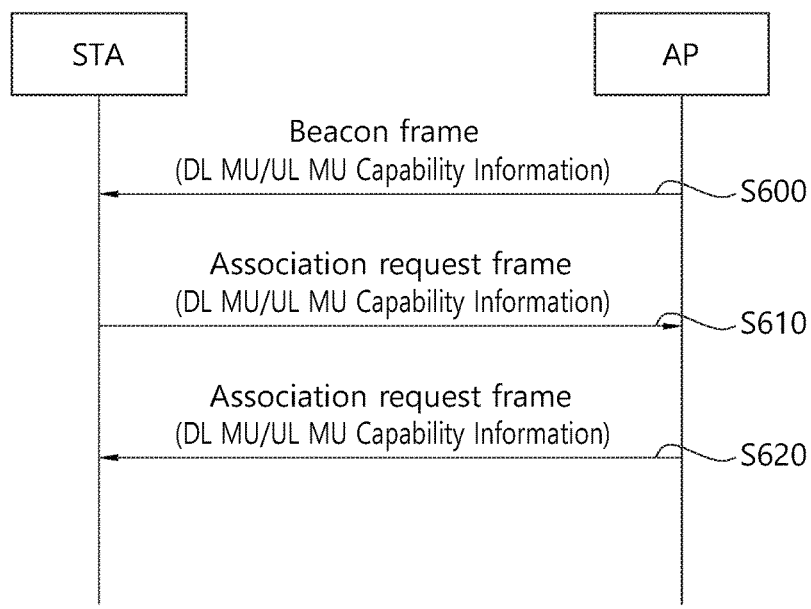
FIG. 6 is a conceptual view illustrating a preliminary procedure for a MU transmission between a plurality STAs operating in the power save mode and an AP according to an exemplary embodiment of the present invention.

FIG. 6 is a conceptual view illustrating a preliminary procedure for a MU transmission between a plurality STAs operating in the power save mode and an AP according to an exemplary embodiment of the present invention.

FIG. 6 discloses a procedure for performing negotiation of the capability corresponding to the DL MU transmission and the UL MU transmission through an initial access frame, which is transmitted and received between the STAs and the AP when performing the initial access procedure of the STA and the AP. The initial access frame may correspond to the frame that is used for the scanning procedure, the authentication procedure and the association procedure, which are described above in FIG. 3. For simplicity in the description, FIG. 6 discloses a negotiation procedure of the capability corresponding to DL MU and UL MU, which are based on a beacon frame, an association request frame, and an association response frame.

For the AP, the capability corresponding DL MU and UL MU may correspond to a capability of transmitting each of a plurality of downlink frames to each of a plurality of STAs based on the DL MU transmission and receiving each of a plurality of uplink frames being transmitted by the plurality of STAs based on the UL MU transmission. For the STA, the capability corresponding DL MU and UL MU may correspond to a capability of receiving downlink frames being transmitted based on the DL MU transmission and transmitting uplink frames being transmitted based on the UL MU transmission.

Referring to FIG. 6, the AP may transmit a beacon frame including information on the DL MU and UL MU capabilities (step S600).

The DL MU and UL MU capability information may also be expressed by using the term MU Tx/Rx capability information or DL MU and UL MU capability field.

The DL MU and UL MU capability information may be included as lower level information (or sub information) being included in a capability field of an extended capabilities element, which is included in an initial access frame.

The STA may receive a beacon frame, and, based on the DL MU and UL MU capability information included in the beacon frame, the STA may verify whether or not DL MU transmission can be performed by the AP and whether or not the AP can receive UL MU transmission. In case the STA determines to perform the reception and transmission of a frame based on the DL MU transmission and the UL MU transmission, the STA may indicate that the reception and transmission of a frame based on the DL MU transmission and UL MU transmission can be performed (or possible) by using the DL MU and UL MU capability information, which is included in the association request frame (step S610).

Based on the DL MU and UL MU capability information included in the association request frame, which is received from the STA, the AP may verify whether or not DL MU transmission to the STA and the UL MU transmission by the STA can be performed.

Based on the DL MU and UL MU capability information included in the association request frame, the AP may indicate that the AP will perform the transmission and reception of a frame based on the DL MU transmission and UL MU transmission (step S620).

Table 1 shown below represents the DL MU and UL MU capability information.

TABLE 1

| Bit | Information | Notes |
| --- | --- | --- |
| 48 | UTF-8 SSID | The SSID in this BSS is interpreted using UTF-8 encoding. |
| 49 | MU Tx/Rx capability | This capability field is set to 1 to indicate the non-AP STA or AP STA supporting the Multi User (MU) Tx/Rx. |
| 50-n | Reserved | |

Whether or not the DL MU transmission to the plurality of STAs operating in the power save mode can be performed and whether or not the UL MU transmission from the plurality of STAs operating in the power save mode can be performed may be determined based on the preliminary negotiation procedure, as disclosed above in FIG. 6.

In FIG. 6, although it is assumed that whether or not the DL MU transmission and the UL MU transmission can be performed is included in the DL MU and UL MU capability information, which corresponds to one set of information, whether or not the DL MU transmission can be performed and whether or not the UL MU transmission can be performed may each be included as a separate set of information.

Figure 7:
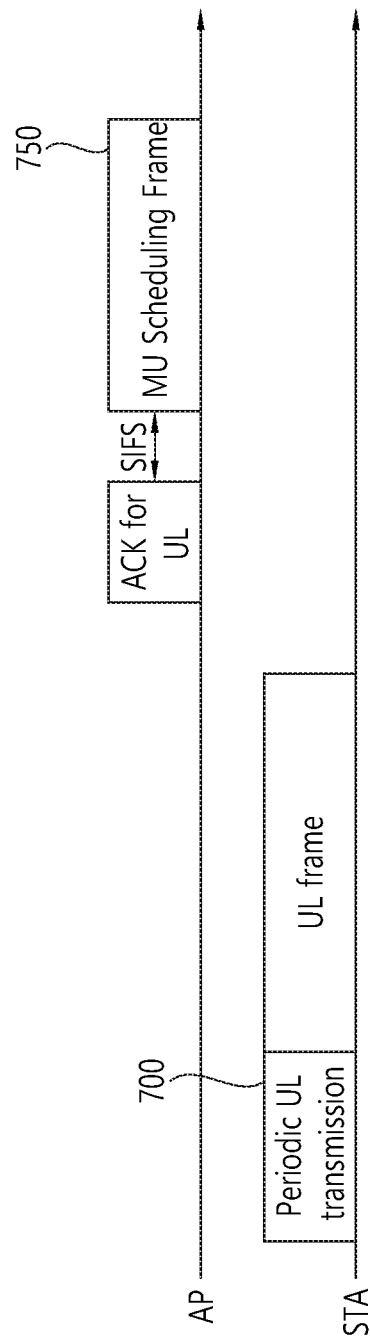
FIG. 7 is a conceptual view illustrating a MU scheduling method for the transmission and reception of periodic data according to an exemplary embodiment of the present invention.

FIG. 7 is a conceptual view illustrating a MU scheduling method for the transmission and reception of periodic data according to an exemplary embodiment of the present invention.

FIG. 7 discloses a scheduling method for the transmission of periodic uplink data by the STA.

Referring to FIG. 7, the STA may indicate the transmission of periodic uplink data through the UL transmission. For example, the STA may transmit an uplink frame, which includes a periodic uplink transmission field 700, to the AP. The periodic uplink transmission field 700 may indicate the periodic transmission of uplink data. The periodic uplink transmission field 700 may also be expressed by using the term periodic uplink (UL) indication field.

For example, a MAC header of the uplink frame being transmitted by the STA may be included in the periodic uplink transmission field 700, and the periodic uplink transmission field 700 may indicate the need (or necessity) for the transmission of periodic uplink data by the STA. Among a type field being included in a frame control field of the MAC header, 1 bit may be used as a bit for the periodic uplink transmission field 700. Such transmission method of the periodic uplink transmission field 700 is merely exemplary. The periodic uplink transmission field 700 may be transmitted from diverse positions within the uplink frame, or a separate frame including information for indicating the periodic transmission of uplink data may also be transmitted.

The AP, which has received the uplink frame including the periodic uplink transmission field 700 that is transmitted by the STA, may transmit an ACK frame to the STA. The AP may transmit to the STA a MU scheduling frame 750 for scheduling an uplink resource for the uplink data, which is periodically transmitted by the STA. The MU scheduling frame 750 may include information for scheduling not only resources for the periodically transmitted uplink data of the STA but for also scheduling resources for the transmission of uplink data of other STAs.

The STA may receive the MU scheduling frame 750, and, then, the STA may transmit periodic uplink data through an uplink resource, which is indicated based on the information on the uplink resource for the STA being included in the MU scheduling frame 750.

Additionally, according to the exemplary embodiment of the present invention, the STA may additionally transmit information on a packet size of the periodic uplink data (or periodic packet size information) being transmitted by the STA to the AP. The uplink data being periodically transmitted by the STA may have a variable packet size. The STA may also notify information on the packet size that is to be periodically transmitted by the STA to the AP, and the AP may determine the size of the uplink resource for the STA based on the information on the packet size that is to be periodically transmitted by the STA, and, then, the AP may allocate the determined uplink resource to the STA.

For example, the periodic packet size information may be transmitted by being included in the MAC header. The STA may periodically/aperiodically transmit the periodic packet size information to the AP, and the AP may acquire information on the packet size that is being periodically varied (or changed). The AP may determine the size of the uplink resource (e.g., channel bandwidth and/or uplink (UL) duration) being allocated to the STA within a frequency axis and/or a time axis based on the information on the periodic packet size.

Figure 8:
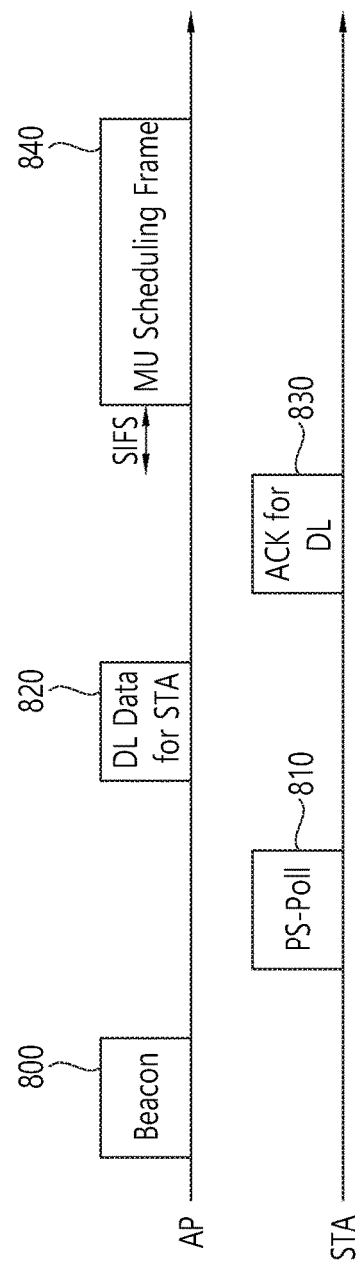
FIG. 8 is a conceptual view illustrating a MU scheduling method for the transmission and reception of periodic data according to an exemplary embodiment of the present invention.

FIG. 8 is a conceptual view illustrating a MU scheduling method for the transmission and reception of periodic data according to an exemplary embodiment of the present invention.

FIG. 8 discloses a scheduling method for the transmission of periodic downlink data by the AP. The AP may transmit information indicating the transmission of the periodic downlink data to a plurality of STAs. For example, the AP may transmit a downlink frame including a periodic downlink transmission field to a plurality of STAs. The periodic downlink transmission field may indicate periodic transmission of downlink data.

Referring to FIG. 8, the AP may transmit a beacon frame 800. The STA may transmit a PS-poll frame 810 for requesting a transmission of downlink data based on a traffic indication map (TIM) element, which is included in the beacon frame 800, to the AP. The AP may receive the PS-poll frame 810, and, then, the AP may transmit a downlink data frame 820 to the STA as a response to the received PS-poll frame 810. The downlink data frame 820 that is being transmitted by the AP may include a periodic downlink transmission field. The periodic downlink transmission field may indicate periodic transmission of downlink data performed by the AP. Among the type field of a frame control field of the downlink data frame 820, 1 bit may be defined as the periodic downlink transmission field. as a bit for the periodic uplink transmission field.

The STA may transmit an ACK frame 830 to the AP as a response to the received downlink frame 820.

The AP may transmit a MU scheduling frame 840 to the AP. The MU scheduling frame 840 may not only schedule resources for downlink data being periodically transmitted to the STA by the AP but may also schedule resources for the transmission of downlink data being periodically transmitted to other STAs.

The STA may receive the MU scheduling frame 840 and, then, the STA may receive downlink data being periodically transmitted through a downlink resource, which is indicated based on the information on the downlink resource for the STA included in the MU scheduling frame 840.

The information on the downlink resource may include information on a size of a downlink resource (e.g., channel bandwidth and/or downlink (DL) duration) being allocated for the reception of downlink data by the STA within a frequency domain and/or time domain.

FIG. 7 discloses a method, wherein a periodic UL MU transmission (or periodic uplink data transmission) is indicated based on a periodic uplink transmission field being transmitted by the STA, and FIG. 8 discloses a method, wherein a periodic DL MU transmission (or periodic downlink data transmission) is indicated based on a periodic downlink transmission field being transmitted by the AP. The periodic UL transmission/periodic DL transmission may both be indicated by the AP or the STA.

Figure 9:
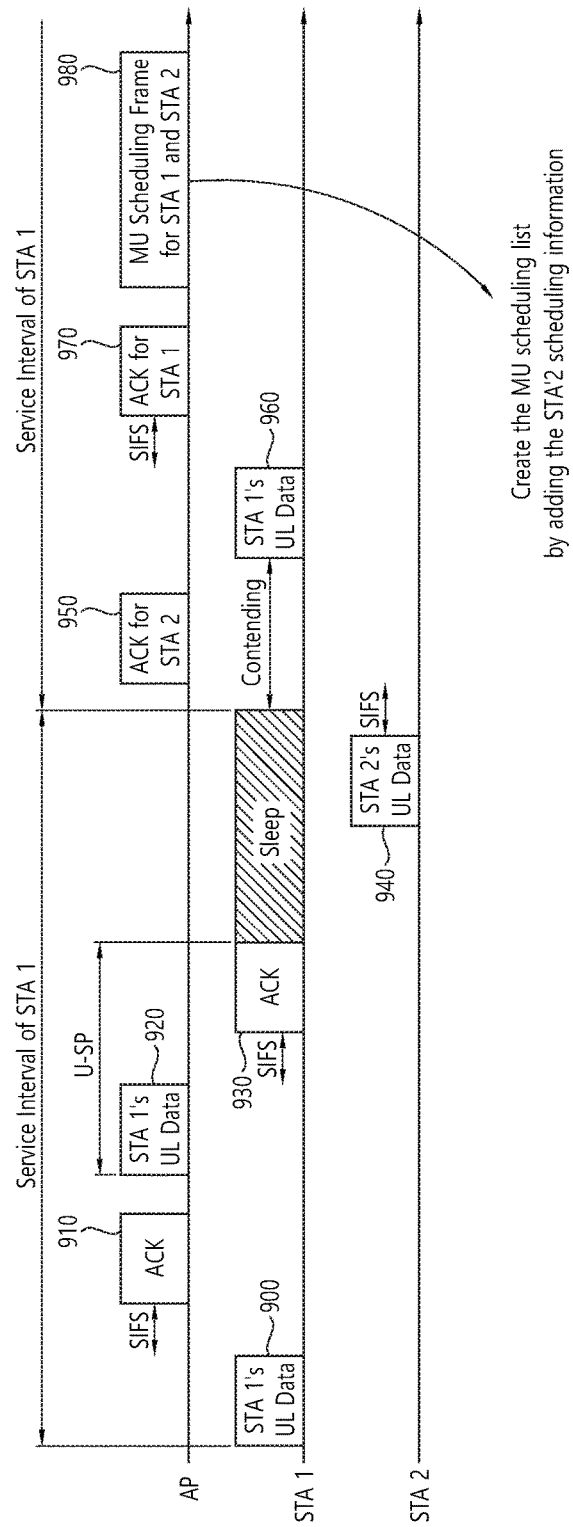
FIG. 9 is a conceptual view illustrating a MU scheduling method for the transmission and reception of periodic data according to an exemplary embodiment of the present invention.

FIG. 9 is a conceptual view illustrating a MU scheduling method for the transmission and reception of periodic data according to an exemplary embodiment of the present invention.

In case periodic UL MU transmission and periodic DL MU transmission are required, FIG. 9 discloses an indication method of the periodic UL MU transmission/DL MU transmission performed by the STA. In case an application service, such as VoIP, is being executed between the AP and a plurality of STAs, periodic UL MU transmission and periodic DL MU transmission may be required between the AP and the plurality STAs. The STA may transmit a periodic uplink/downlink transmission field for indicating the need (or necessity) for the periodic UL MU transmission/DL MU transmission to the AP. The AP, which has received the periodic uplink/downlink transmission field from each of the plurality of STAs, may perform scheduling of the resources for the periodic DL MU transmission/periodic UL MU transmission to the plurality of STAs. More specifically, in case the AP receives a frame including the periodic uplink/downlink transmission field from each of the plurality of STAs, the AP may perform scheduling of resources for the transmission of periodic uplink data performed by each of the plurality of STAs and resources for the transmission of periodic downlink data to each of the plurality of STAs.

Referring to FIG. 9, STA1 may transmit uplink data frame1 900 during a service interval for STA1. The uplink data frame1 900 may include a periodic uplink/downlink transmission field, and the periodic uplink/downlink transmission field may indicate the need for the transmission of periodic uplink data and the reception of periodic downlink data both performed by STA1. The AP may transmit an ACK frame 910 to STA1 as a response to the received uplink data frame1 900. The AP may transmit downlink data frame1 920 including periodic downlink data for STA1 to STA1.

By transmitting a scheduling frame intended only for STA1, the AP may also perform scheduling of an uplink resource for the transmission of periodic uplink data performed by STA1 and a downlink resource for the reception of periodic downlink data performed by STA1.

Similarly, STA2 may transmit uplink data frame2 940 through a contention-based access during a sleep period of STA1. The uplink data frame2 940 may include a periodic uplink/downlink transmission field, and the periodic uplink/downlink transmission field may indicate the need for the transmission of periodic uplink data and the reception of periodic downlink data both performed by STA2. The AP may transmit an ACK frame 950 to STA2 as a response to the received uplink data frame2 940.

STA1 may transmit uplink data frame3 960 including periodic uplink data. Similarly, the uplink data frame3 960 may include a periodic uplink/downlink transmission field indicating the need for the transmission of periodic uplink data and the reception of periodic downlink data both performed by STA1. The AP may transmit an ACK frame 970 to STA1 as a response to the received uplink data frame3 960.

The AP, which has received the periodic uplink/downlink transmission field from each of STA1 and STA2, may transmit a MU scheduling frame 980, which is transmitted to both STA1 and STA2.

The MU scheduling frame 980 may include scheduling information corresponding to the uplink resource/downlink resource for the transmission of periodic uplink data and the reception of periodic downlink data both performed by STA1 and scheduling information corresponding to the uplink resource/downlink resource for the transmission of periodic uplink data and the reception of periodic downlink data both performed by STA2.

Each of STA1 and STA2 may transmit periodic uplink data to the AP and receive periodic downlink data from the AP based on an uplink resource and a downlink resource, which are scheduled based on the MU scheduling frame 980.

In FIG. 7 to FIG. 9, it is shown that the periodic uplink transmission field, the periodic downlink transmission field, and the periodic uplink/downlink transmission field are separately defined. However, according to another exemplary embodiment of the present invention, a periodic traffic type field (or information) is separately defined, and the periodic traffic field may indicate one of the periodic uplink data transmission, the periodic downlink data transmission, and the periodic uplink/downlink data transmission.

Figure 10:
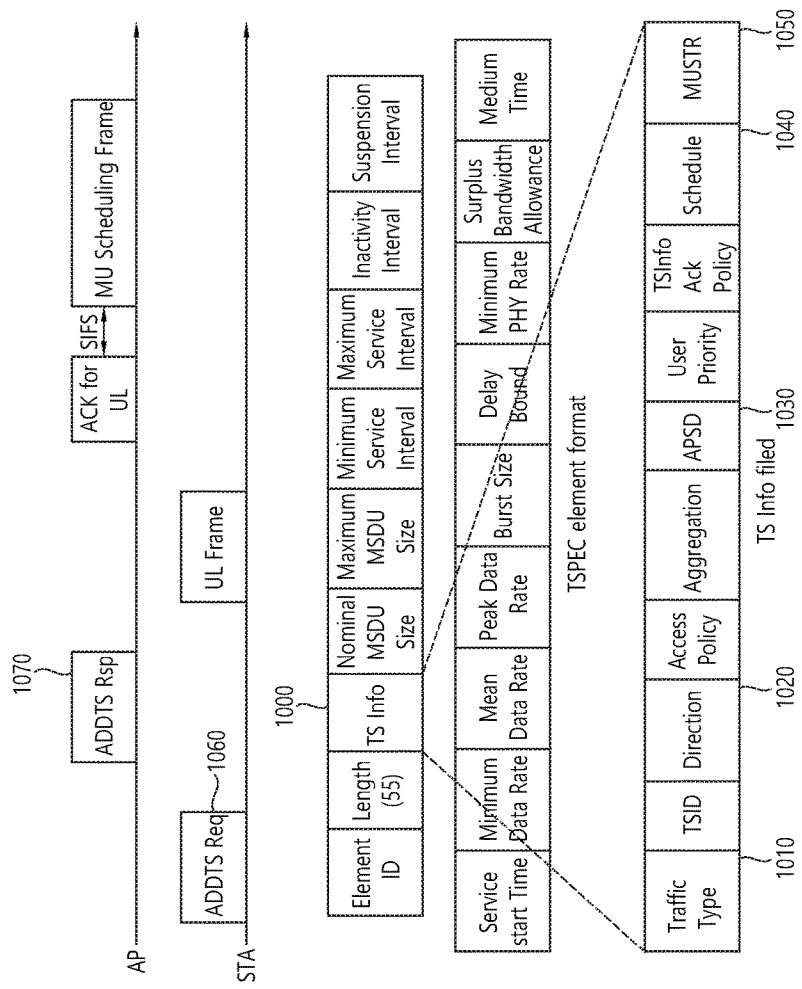
FIG. 10 is a conceptual view illustrating a negotiation method corresponding to traffic specification according to an exemplary embodiment of the present invention.

FIG. 10 is a conceptual view illustrating a negotiation method corresponding to traffic specification according to an exemplary embodiment of the present invention.

FIG. 10 discloses a negotiation method for transmitting and receiving traffic between a plurality of STAs and the AP based on an add traffic stream (ADDTS) request frame 1060/ADDTS response frame 1070.

More specifically, prior to transmitting and receiving the uplink data/downlink data, the STA and the AP may transmit and receive an ADDTS request frame 1060/ADDTS response frame 1070, thereby being capable of first carrying out a negotiation on the traffic specification. According to the exemplary embodiment of the present invention, the AP may allocate downlink resources/uplink resources for the transmission and reception to and from the plurality of STAs based on the ADDTS request frame 1060 and the ADDTS response frame 1070. The ADDTS request frame 1060 and the ADDTS response frame 1070 are given merely as an example. Other frames may be used for the negotiation of traffic specification, or a separate frame may be used for the negotiation of traffic specification between the plurality of STAs and the AP.

The ADDTS request frame 1060 and the ADDTS response frame 1070 may include a TSPEC element.

Hereinafter, for simplicity, description will be given based on the ADDTS request frame 1060. The AP may indicate the acceptance of the request made by the ADDTS request frame 1060 based on the ADDTS response frame 1070, or the AP may perform negotiation on the traffic specification with the STA based on the ADDTS response frame 1070.

The TSPEC element of the ADDTS request frame 1060 is disclosed in 8.4.2.29 TSPEC element of IEEE Standard for Information technology-Telecommunications and information exchange between systems Local and metropolitan area networks-Specific requirements Part 11: Wireless LAN Medium Access Control (MAC) and Physical Layer (PHY) Specifications (hereinafter referred to as IEEE 802.11 spec), which was disclosed in October 2013.

Additionally, information (field or sub field) that is included in a TS info field 1000, which is included in the TSPEC element, is also disclosed in FIG. 8-197 of 8.4.2.29 TSPEC element of the IEEE 802.11 spec. The fields that are included in the TS info field 1000 may include the following information.

A Traffic Type field being included in the TS Info field 1000 of the TSPEC element may include information for indicating whether or not the traffic corresponds to a periodic traffic pattern.

A direction field 1020 being included in the TS Info field 1000 may include information indicating whether a traffic corresponding to a specific traffic identifier (TID) corresponds to an uplink traffic or a downlink traffic or a two-way (or bi-directional) (uplink+downlink) traffic.

An automatic power save delivery (APSD) field 1030 being included in the TS Info field 1000 may include information indicating whether or not the corresponding traffic will be transmitted or received by using the APSD. The APSD corresponds to a mechanism for carrying (or delivering) downlink data and a bufferable management frame to an STA, which is being operated in the power save mode. The APSD is defined as two different types of delivery mechanisms for unscheduled-APSD (U-APSD) and scheduled-APSD (S-APSD). The STA may use the U-APSD in order to allow part or all of a Bufferable Unit (BU) to be delivered during an unscheduled Service Period (SP). And, the STA may use the S-APSD in order to allow part or all of the BU to be delivered during a scheduled service period.

More specifically, in case the U-APSD, which is defined in the IEEE 802.11e, is used as the power save mode, when the STA transmits a trigger frame to the AP and notifies an awake state of the STA, the AP may transmit downlink data to the STA, and the STA may transmit uplink data to the AP. Unlike the U-APSD, the S-APSD corresponds to a method of transmitting and receiving data by shifting to and from the awake state and the doze state in accordance with a predefined schedule between the AP and a user equipment.

A Power Save Multi-Poll (PSMP), which is defined in the IEEE 802.11n, may notify transmission schedules of the downlink data and the uplink data of each of the STAs from the AP to each STA, and each of the STAs may be shifted to the awake state and the doze state in accordance with the received transmission schedule. More specifically, in the PSMP, the AP may transmit a PSMP frame including time information (time slot information) on the tie during which the uplink and downlink are to be used to each of the STAs. Then, based on the received PSMP frame, each of the STAs may know the slot time respectively allocated to each of the STAs and may be operated in the doze state until the allocated slot time.

A schedule field 1040 being included in the TS Info field 1000 may include information on whether the traffic will be controlled by the STA or AP based scheduling or whether the traffic will be controlled based on unscheduling. For example, in case the APSD field 1030 is set to 0 and the schedule field 1040 is set to 1, the traffic, which is transmitted and received based on the ADDTS request frame 1060/ADDTS response frame 1070, may be controlled based on a scheduled power save multi poll (PSMP).

According to the exemplary embodiment of the present invention, a method for indicating scheduling of DL MU transmission to a plurality of STAs and/or scheduling of UL MU transmission performed by a plurality of STAs based on a TSPEC element is disclosed. More specifically, the TSPEC element may indicate scheduling of DL MU transmission to a plurality of STAs/UL MU transmission performed by a plurality of STAs. For example, the TS Info field 1000 may include a multi user simultaneous transmission and receiving (MUSTR) field 1050 as a field for indicating the DL MU transmission to a plurality of STAs and/or the UL MU transmission performed by a plurality of STAs.

In case the value of the MUSTR field 1050 is equal to 1, the DL MU transmission to a plurality of STAs and/or the UL MU transmission performed by a plurality of STAs) may be indicated.

As described below, the ASPD field 1030, the schedule field 1040, and the MUSTR field 1050, which are included in the TS info field 1000 may indicate information on scheduling/unscheduling/information on the power save mode, and information on multiple transmission (information on the DL MU transmission to a plurality of STAs and/or the UL MU transmission performed by a plurality of STAs).

TABLE 2

| APSD | Schedule | MUSTR | Usage |
| --- | --- | --- | --- |
| 0 | 0 | 0 | No schedule |
| 1 | 0 | 0 | Unscheduled APSD |
| 0 | 1 | 0 | Scheduled PSMP |
| 1 | 1 | 0 | Scheduled APSD |
| 0 | 1 | 1 | Scheduled MUSTR |

In case the APSD field 1030 is equal to 0, the schedule field is equal to 0, and the MUSTR field 1050 is equal to 0, this may indicate that a separate scheduling is not performed on the traffic. This may also indicate that APSD-based and PSMP-based operations of the STA are not performed.

In case the APSD field 1030 is equal to 1, the schedule field is equal to 0, and the MUSTR field 1050 is equal to 0, this may indicate the performance of U-APSD-based operations.

In case the APSD field 1030 is equal to 0, the schedule field is equal to 1, and the MUSTR field 1050 is equal to 0, this may indicate the performance of S-PSMP-based operations.

In case the APSD field 1030 is equal to 1, the schedule field is equal to 1, and the MUSTR field 1050 is equal to 0, this may indicate the performance of S-APSD-based operations.

In case the APSD field 1030 is equal to 0, the schedule field is equal to 1, and the MUSTR field 1050 is equal to 1, this may indicate the performance of S-MUSTR-based operations, i.e., operations based on the DL MU transmission to a plurality of STAs and/or the UL MU transmission performed by a plurality of STAs.

For example, in case the AP receives an ADDTS request frame 1060 having its MUSTR field 1050 set to 1, the AP may determine whether or not to accept the operations based on the DL MU transmission to a plurality of STAs and/or the UL MU transmission performed by a plurality of STAs and may transmit the ADDTS response frame 1070 to the STA. More specifically, after receiving a verification on the S-MUSTR operations of the STA based on the ADDTS, the STA may perform the transmission and reception of periodic uplink data/periodic downlink data.

Figure 11:
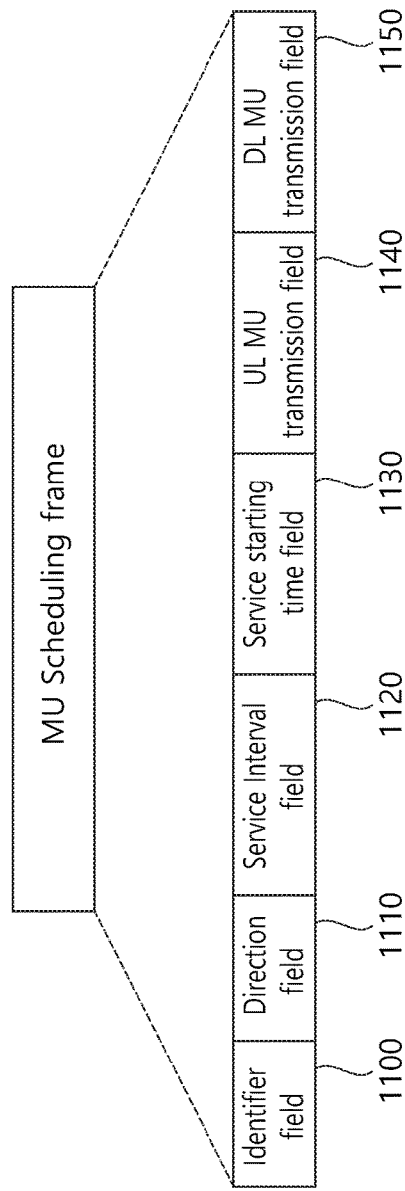
FIG. 11 is a conceptual view illustrating a MU scheduling frame according to an exemplary embodiment of the present invention.

FIG. 11 is a conceptual view illustrating a MU scheduling frame according to an exemplary embodiment of the present invention.

FIG. 11 discloses a MU scheduling frame for scheduling uplink resources/downlink resources for transmitting periodic uplink data and for receiving periodic downlink data corresponding to each of a plurality of STAs.

Referring to FIG. 11, the MU scheduling frame may include an identifier field 1100, a direction field 1110, a service interval field 1120, a service start time field 1130, a UL MU information field 1140, and a DL MU information field 1150.

The identifier field 1100 may include information on an identifier (e.g., association identifier (AID), partial association identifier (PAID)) of a STA being scheduled based on the MU scheduling frame.

The direction field 1110 may include information on a link is that is being scheduled based on the MU scheduling frame. The direction field 1110 may indicate one of scheduling of resources for the UL MU transmission, scheduling of resources for the DL MU transmission, and scheduling of resource for DL MU/UL MU transmission.

The service interval field 1120 may include information on service intervals for the periodic DL MU transmission to the plurality of STAs and/or the periodic UL MU transmission performed by the plurality of STAs.

The service start time field 1130 may include information for indicating a start time (or starting point) of a service (i.e., service start time) for the periodic DL MU transmission to the plurality of STAs and/or the periodic UL MU transmission performed by the plurality of STAs. The service start time may indicate a start time of the periodic DL MU transmission or the periodic UL MU transmission, after the transmission of the MU scheduling frame.

The UL MU information field 1140 may include resource allocation information for the periodic uplink transmission of each of the plurality of STAs. For example, the UL MU information field 1140 may include information on a channel number (or subband number) for the periodic uplink transmission based on UL MU OFDMA performed by each of the plurality of STAs and information on space time streams for the periodic uplink transmission based on UL MU MIMO performed by each of the plurality of STAs. Additionally, the UL MU information field 1140 may include information on the overall bandwidth for the UL MU transmission, and modulation information (modulation and coding scheme (MCS) information) of the uplink data.

The DL MU information field 1150 may include resource allocation information for the periodic downlink transmission of each of the plurality of STAs. For example, the DL MU information field 1150 may include information on a channel number (or subband number) for the periodic downlink transmission based on DL MU OFDMA to each of the plurality of STAs and information on space time streams for the periodic downlink transmission based on DL MU MIMO to each of the plurality of STAs. Additionally, the DL MU information field 1150 may include information on the overall bandwidth for the DL MU transmission, and modulation information (MCS information) of the downlink data.

A UL MU resource and a DL MU resource may be allocated to the same STA based on the MU scheduling frame, and each of the UL MU resource and DL MU resource may also be allocated to different STAs. More specifically, an STA being allocated with the UL MU resource and an STA being allocated with the DL MU resource may be different from one another.

Figure 12:
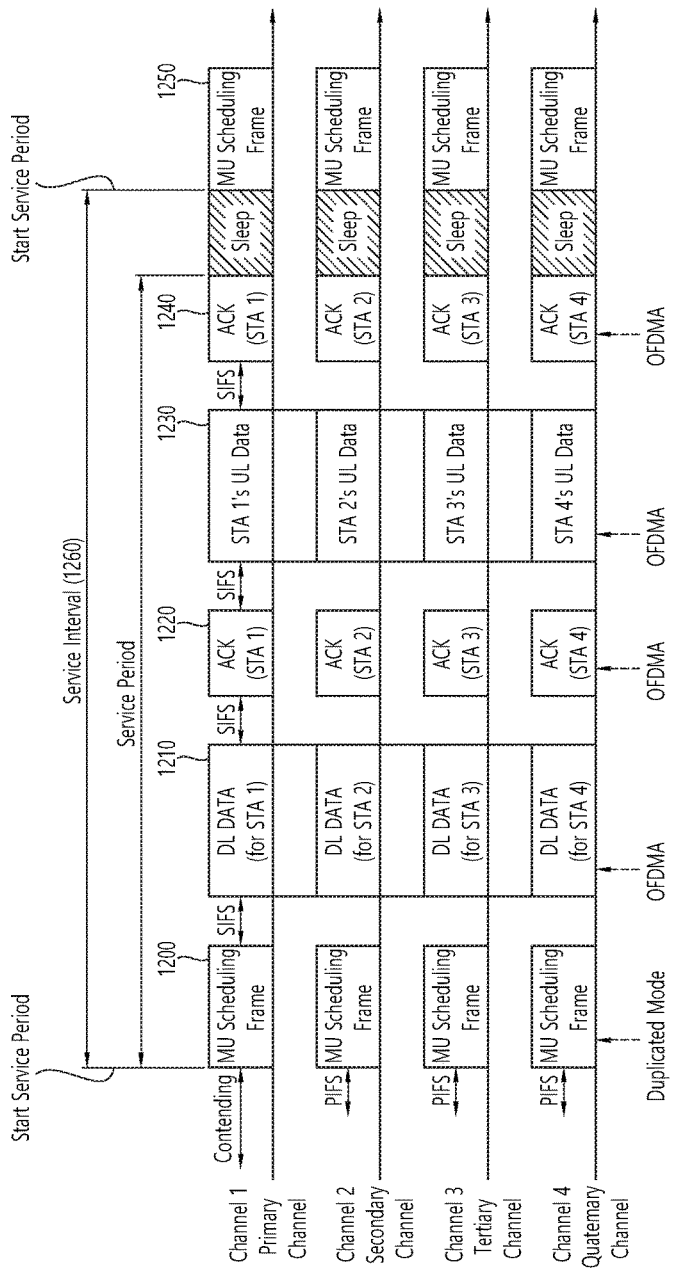
FIG. 12 is a conceptual view illustrating a periodic DL MU transmission and a periodic UL MU transmission based on MU scheduling according to an exemplary embodiment of the present invention.

FIG. 12 is a conceptual view illustrating a periodic DL MU transmission and a periodic UL MU transmission based on MU scheduling according to an exemplary embodiment of the present invention.

FIG. 12 discloses DL MU transmission of the AP to the plurality of STAs and UL MU transmission of the plurality of STAs to the AP based on the MU scheduling frame.

Referring to FIG. 12, the AP may transmit the MU scheduling frame to the plurality of STAs through a primary channel, a secondary channel, a tertiary channel, and a quaternary channel. Hereinafter, the primary channel may also be expressed by using the term Channel1 (or Subband 1), the secondary channel may also be expressed by using the term Channel2 (or Subband 2), the tertiary channel may also be expressed by using the term Channel3 (or Subband 3), and the quaternary channel may also be expressed by using the term Channel4 (or Subband 4).

The AP may respectively transmit a MU scheduling frame 1200 to each of STA1 to STA4 through Channel 1 to Channel 4 by using a DL MU transmission based on a duplicate format PHY protocol data unit (PPDU) or OFDMA.

The duplicate PPDU format may replicate (or duplicate) the PPDU format being transmitted through a neighboring channel (or Channel 1) and may be transmitted through a bandwidth exceeding Channel 1 (e.g., 40 MHz, 80 MHz, 160 MHz, 80 MHz+80 MHz, etc.). In case the duplicate format is being used, the same data may be transmitted through each of a plurality of channels (duplication target channels and duplicate channels).

For example, the MU scheduling frame 1200 may include identifier information for each of STA1 to STA4, a direction field indicating the scheduling of resources for the DL/UL MU transmission, a service interval field including information on service intervals for the periodic DL MU transmission to the plurality of STAs and the periodic UL MU transmission performed by the plurality of STAs, a service start time field including information for indicating a start time of a service interval for the periodic DL MU transmission to the plurality of STAs and the periodic UL MU transmission performed by the plurality of STAs. Additionally, the MU scheduling frame 1200 may also include a DL MU information field including information on downlink resources being allocated to each of the STA1 to STA4 for the transmission of periodic downlink data to each of STA1 to STA4, and a UL MU information field including information on uplink resources being allocated to each of STA1 to STA4 for the transmission periodic uplink data performed by each of STA1 to STA4.

Each of STA1 to STA4 being indicated based on the identifier information may receive a downlink frame 1210 including periodic downlink data corresponding to each of STA1 to STA4 through a downlink resource that is allocated based on the DL MU information field. For example, STA1 may be allocated with Channel1 and may receive downlink data frame1 including periodic downlink data1 being transmitted to STA1 through Channel1. STA2 may be allocated with Channel2 and may receive downlink data frame2 including periodic downlink data2 being transmitted to STA2 through Channel2. STA3 may be allocated with Channel3 and may receive downlink data frame3 including periodic downlink data3 being transmitted to STA3 through Channel3. STA4 may be allocated with Channel4 and may receive downlink data frame4 including periodic downlink data4 being transmitted to STA4 through Channel4.

Each of downlink data frame1 to downlink data frame4 may be respectively transmitted to each of STA1 to STA4 by the AP through a MU PPDU format, which will be described later on.

Each of STA1 to STA4 may respectively transmit an ACK frame 1120 to the AP as a response to each of the received downlink data frame1 to downlink data frame4. The ACK frame 1120 may be transmitted by each of STA1 to STA4 based on UL MU.

Each of STA1 to STA4 may transmit an uplink frame 1230 including periodic uplink data to the AP based on UL MU transmission through an uplink resource that is allocated based on the UL MU information field. For example, STA1 may be allocated with Channel1 and may transmit uplink data frame1 including periodic uplink data1 to the AP through Channel1. STA2 may be allocated with Channel2 and may transmit uplink data frame2 including periodic uplink data2 to the AP through Channel2. STA3 may be allocated with Channel3 and may transmit uplink data frame3 including periodic uplink data3 to the AP through Channel3. STA4 may be allocated with Channel4 and may transmit uplink data frame4 including periodic uplink data4 to the AP through Channel4.

Each of uplink data frame1 to uplink data frame4 may be respectively transmitted to each of STA1 to STA4 within an overlapping time resource by the AP through a MU PPDU format, which will be described in detail later on.

As a response to downlink data frame1 to downlink data frame4, which are received from each of STA1 to STA4, the AP may transmit an ACK frame 1240 to each of STA1 to STA4. The ACK frame 1240 may also be transmitted to the AP based on DL MU.

According to the exemplary embodiment of the present invention, the service interval 1260 may be defined as a time period for N number of DL MU transmissions and N number of UL MU transmissions (wherein N is an integer). In FIG. 12, a case when N=1 will be assumed. The start time of the service interval 1260 may correspond to a transmission time of a MU scheduling frame.

In case one DL MU transmission and a transmission of an ACK frame according to the one DL MU transmission and one UL MU transmission and a transmission of an ACK frame according to the one UL MU transmission are ended (or completed or terminated) within the service interval 1260, a plurality of STAs may be shifted to the doze state until the end of the service interval 1260. A STA performing periodic DL MU/periodic UL MU transmission based on the service interval 1260 may be operated in the power save mode.

The time consumed for the one DL MU transmission and the transmission of an ACK frame according to the one DL MU transmission and the one UL MU transmission and the transmission of an ACK frame according to the one UL MU transmission within the service interval 1260 may be expressed by using the term actual service period. STA1 to STA4 may respectively receive an ACK frame as a response to uplink frame1 to uplink frame4 and may then be shifted to the doze state.

In case the service interval 1260 has ended, a MU scheduling frame 1250 for the DL MU transmission and UL MU transmission may be transmitted once again during the next service interval.

By using the above-described method, each of STA1 to STA4 may once again receive periodic downlink data through downlink resources that are allocated based on the MU scheduling frame, and each of STA1 to STA4 may transmit periodic uplink data through uplink resources that are allocated based on the MU scheduling frame.

Periodic downlink data and periodic uplink data may be transmitted and received between the plurality of STAs and the AP through at least one service interval.

Figure 13:
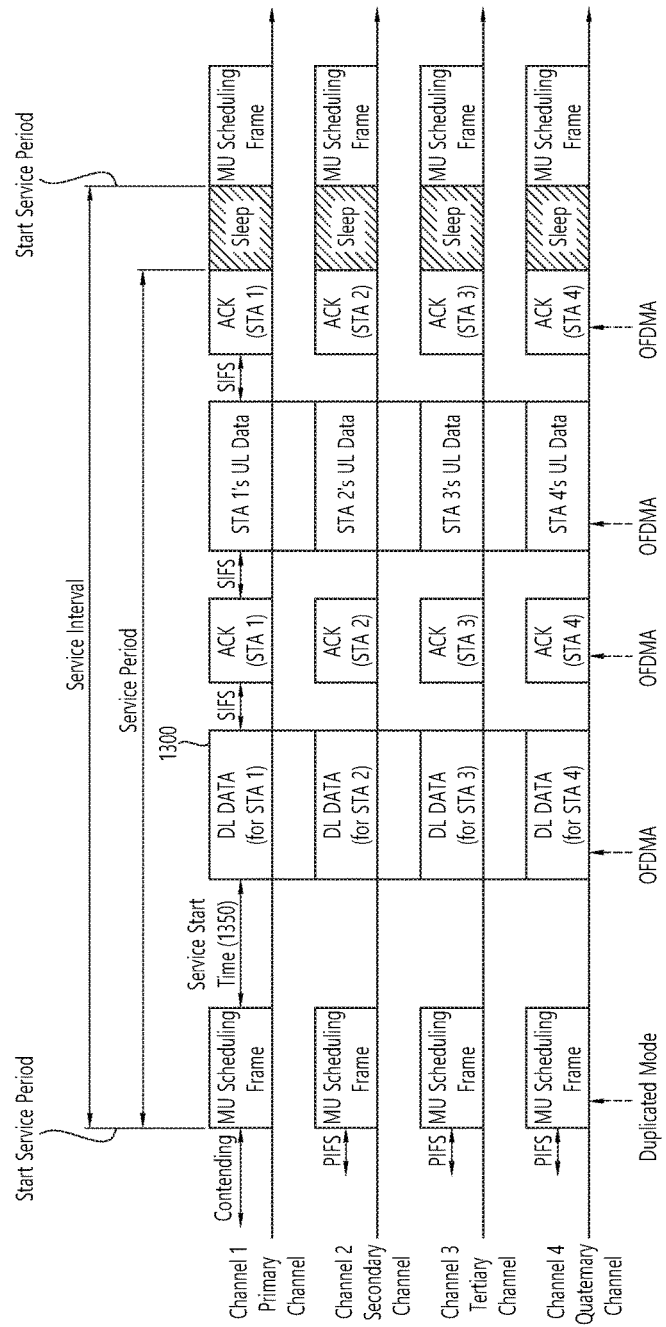
FIG. 13 is a conceptual view illustrating a periodic DL MU transmission and a periodic UL MU transmission based on MU scheduling according to an exemplary embodiment of the present invention.

FIG. 13 is a conceptual view illustrating a periodic DL MU transmission and a periodic UL MU transmission based on MU scheduling according to an exemplary embodiment of the present invention.

FIG. 13 discloses periodic DL MU transmission performed by the AP to a plurality of STAs and periodic UL MU transmission performed by a plurality of STAs to the AP based on a MU scheduling frame. Most particularly, FIG. 13 discloses a method for indicating a service start time based on the MU scheduling frame.

Referring to FIG. 13, the MU scheduling frame may include a service start time field. The service start time field may include information for indicating a service start time 1350 for periodic DL MU transmission to a plurality of STAs and/or periodic UL MU transmission performed by a plurality of STAs. The service start time 1350 may indicate the start time of the periodic DL MU transmission or the periodic UL MU transmission, after the transmission of the MU scheduling frame.

Each of STA1 to STA4 that has received the MU scheduling frame may receive a downlink frame 1300, which is transmitted based on the DL MU transmission, at a service start time 1350, which is indicated based on the service start time field. The AP may respectively transmit downlink frame1 to downlink frame4 to each of STA1 to STA4 through a MU PPDU format. Each of STA1 to STA4 that has received the MU scheduling frame may be shifted to the doze state until the service start time 1350, which is indicated based on the service start time field and may then be shifted back to the awake state at the service start time in order to be operated.

FIG. 13 discloses a case when each of STA1 to STA4 is indicated with the same service start time. However, in other exemplary embodiments of the present invention, the AP may also indicate different service start times for each of the plurality of STAs based on the service start time field.

Figure 14:
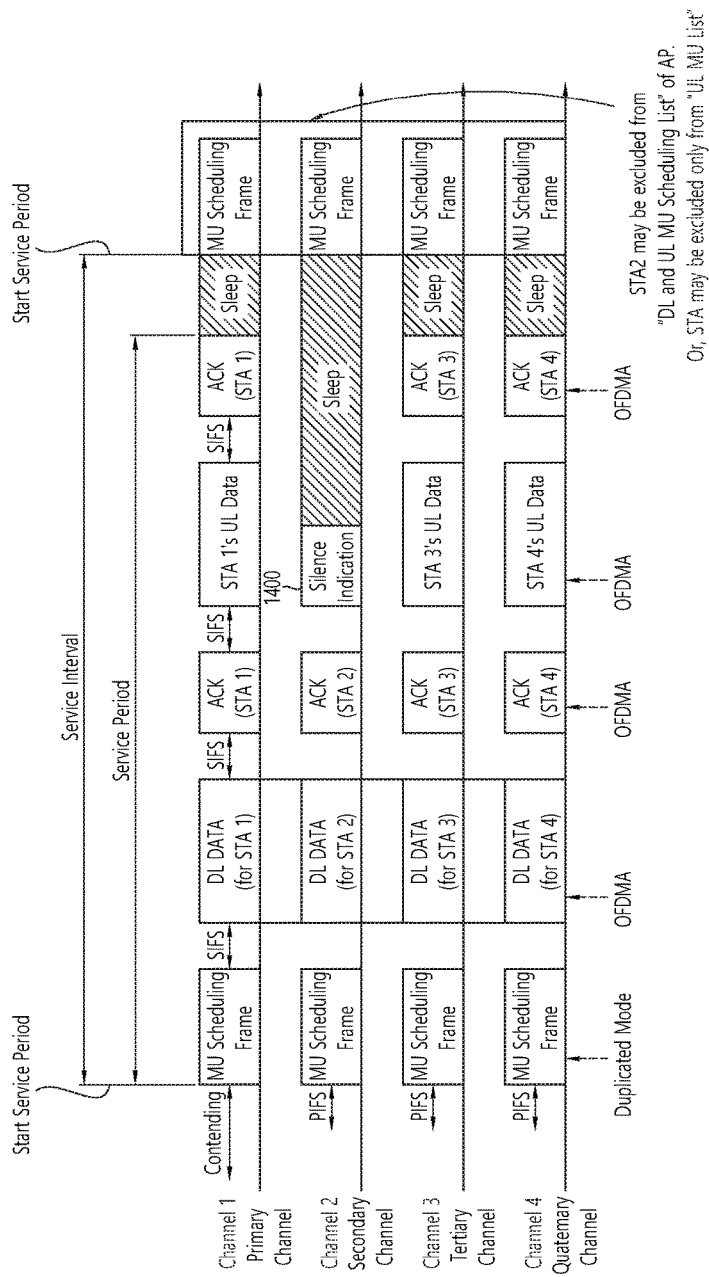
FIG. 14 is a conceptual view illustrating a periodic DL MU transmission and a periodic UL MU transmission based on MU scheduling according to an exemplary embodiment of the present invention.

FIG. 14 is a conceptual view illustrating a periodic DL MU transmission and a periodic UL MU transmission based on MU scheduling according to an exemplary embodiment of the present invention.

FIG. 14 discloses DL MU transmission performed by the AP to a plurality of STAs and UL MU transmission performed by a plurality of STAs to the AP based on a MU scheduling frame. Most particularly, FIG. 14 discloses changes in the plurality of STAs being scheduled by the MU scheduling frame.

Referring to FIG. 14, STA2 may receive only the periodic downlink data from the AP based on the DL MU transmission and may not perform transmission of the periodic uplink data, which is based on the UL MU transmission. In this case, in order to perform periodic downlink data transmission and periodic uplink data reception, the AP may change a list (or MU scheduling list) of the STAs being scheduled based on the MU scheduling frame.

For example, the MU scheduling list may be divided into a UL MU scheduling list scheduling uplink transmission resources for uplink data transmission and a DL MU scheduling list scheduling downlink transmission resources for downlink data transmission. STA2 may be excluded from the UL MU scheduling list.

For example, STA2 may execute a VoIP application, and separate uplink data that are to be periodically transmitted to the AP may not exist. For example, in a VoIP service, a period during which the STA only receives the downlink data may occur.

In this case, in order to indicate that separate uplink data that are to be periodically transmitted do not exist, the STA may transmit a frame (or dummy frame) including a silence indication 1400 to the AP during a UL silence period. The UL silence period corresponds to a period during which pending uplink data do not exist, and the silence indication 1400 may correspond to an indication (or indicator) for indicating that pending uplink data do not exist in the STA.

The AP may receive an uplink frame including a silence indication 1400 from STA2 and may delete STA2 from the MU scheduling list.

Similarly, separate downlink data that are to be periodically transmitted from the AP to the STA may not exist. For example, in a VoIP service, a period during which the STA only transmits the uplink data to the AP may occur.

In this case, in order to indicate that separate downlink data that are to be periodically transmitted to the STA do not exist, the AP may transmit a frame (or dummy frame) including a silence indication to the STA during a DL silence period. The DL silence period corresponds to a period during which downlink data pending to the STA do not exist, and the silence indication may correspond to an indication (or indicator) for indicating that downlink data pending to the STA do not exist. The AP may transmit a downlink frame including a silence indication and may delete STA2 from the MU scheduling list. For example, STA2 may be excluded from the DL MU scheduling list.

Figure 15:
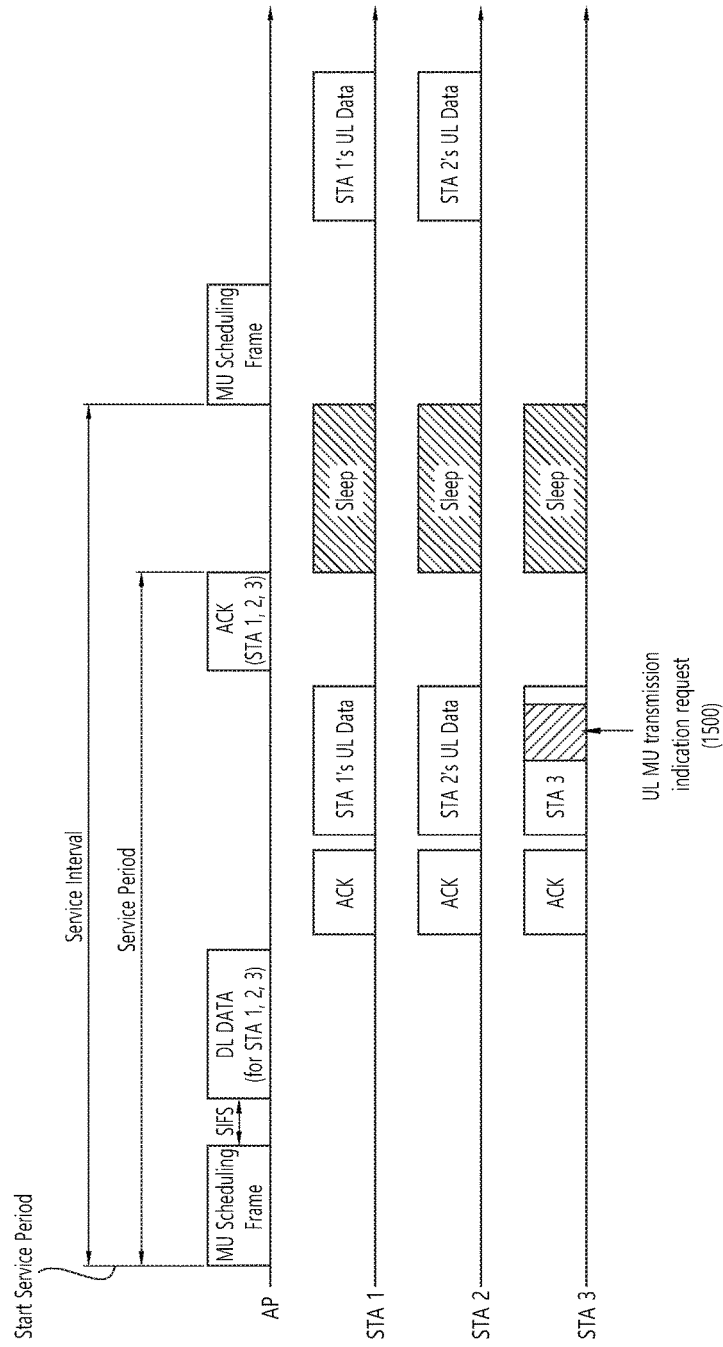
FIG. 15 is a conceptual view illustrating a periodic DL MU transmission and a periodic UL MU transmission based on MU scheduling according to an exemplary embodiment of the present invention.

FIG. 15 is a conceptual view illustrating a periodic DL MU transmission and a periodic UL MU transmission based on MU scheduling according to an exemplary embodiment of the present invention.

FIG. 15 discloses a method for performing termination of periodic DL MU transmission of the AP to a plurality of STAs and termination of periodic UL MU transmission of an STA to the AP.

Referring to FIG. 15, a STA, which is scheduled by a MU scheduling frame being transmitted by the AP, may transmit to the AP an uplink frame including a field for indicating the termination of the transmission of periodic uplink data and the termination of the reception of periodic downlink data.

The field for indicating the termination of the transmission of periodic uplink data and the termination of the reception of periodic downlink data may also be expressed by using the term MU transmission termination request field 1500 or UL MU termination indication field (or DL MU termination indication field).

STA3 may transmit an uplink frame including a MU transmission termination request field 1500 to the AP. The AP may exclude STA3, which has transmitted the uplink frame including a MU transmission termination request field 1500, from the MU scheduling list. More specifically, STA3 may be excluded from being a target STA performing reception of periodic downlink data and transmission of periodic uplink data based on the MU scheduling frame and may then terminate the reception of periodic downlink data and transmission of periodic uplink data.

As another method, the STA may indicate the termination of the periodic DL MU transmission and periodic UL MU transmission based on a MAC header of an uplink frame.

The STA may request for a deletion of the STA from the MU scheduling list based on the MAC header of the uplink data frame. For example, a MU transmission termination parameter may be defined in order to request for the deletion of the STA from the MU scheduling list. The UL MU transmission termination parameter may be included in the MAC header of the UL frame so as to be transmitted to the AP.

According to another exemplary embodiment of the present invention, a specific STA may be deleted from the MU scheduling list without any separate indication based on the determination of the AP.

For example, the AP may not receive a defined maximum number of uplink data including periodic uplink data being transmitted by the STA during a predetermined specific period of time. In this case, the AP may delete the STA from the MU scheduling list.

As another example, the AP may not receive a maximum number of ACK frames corresponding to a downlink frame including periodic downlink data being transmitted by the AP during a predetermined period of time. In this case, the AP may delete the STA from the MU scheduling list.

Figure 16:
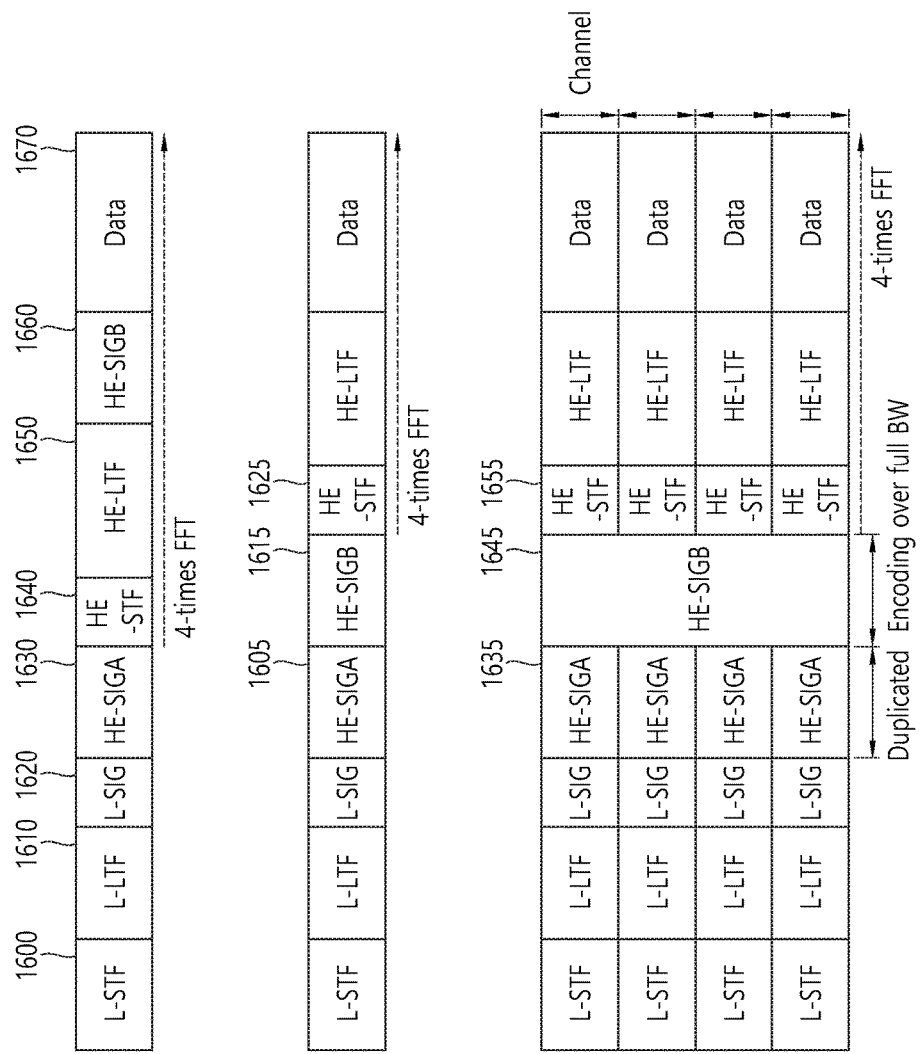
FIG. 16 is a conceptual view illustrating a PPDU format carrying a frame according to an exemplary embodiment of the present invention.

FIG. 16 is a conceptual view illustrating a PPDU format carrying a frame according to an exemplary embodiment of the present invention.

FIG. 16 discloses a PPDU format according to the exemplary embodiment of the present invention. A PPDU may include a PPDU header and a MAC protocol data unit (MPDU) (or physical layer service data unit (PSDU)). A frame may correspond to a MPDU. The PPDU header of the PPDU format may be used as a meaning of including a PHY header and a PHY preamble of the PPDU format.

The PPDU format disclosed in FIG. 16 may be used for carrying (or delivering) the above-described MU scheduling frame, downlink frame, and uplink frame.

Referring to the upper part of FIG. 1, a PPDU header of a PPDU may include a legacy-short training field (L-STF), a legacy-long training field (L-LTF), a legacy-signal (L-SIG), a high efficiency-signal A (HE-SIG A), a high efficiency-short training field (HE-STF), a high efficiency-long training field (HE-LTF), and a high efficiency-signal B (HE-SIG B). The PPDU may be divided into a legacy part, which consists of a part starting from the PHY header to the L-SIG, and a high efficiency (HE) part, which consists of a part after the L-SIG.

The L-STF 1600 may include a short training orthogonal frequency division multiplexing (OFDM) symbol. The L-STF 1600 may be used for frame detection, automatic gain control (AGC), diversity detection, and coarse frequency/time synchronization.

The L-LTF 1610 may include a long training orthogonal frequency division multiplexing (OFDM) symbol. The L-LTF 1610 may be used for fine frequency/time synchronization and channel prediction.

The L-SIG 1620 may be used for transmitting control information. The L-SIG 1620 may include information on data transmission rate, data length, and so on.

The HE-SIG A 1630 may also include identification information of the STA for indicating a target STA that is to receive the PPDU. The STA may determine whether or not to receive a PPDU based on the identification information of the target STA, which is included in the HE-SIG A 1630. In case a STA is indicated based on the HE-SIG A 1630 of the PPDU, the STA may perform additional decoding on the downlink PPDU. Additionally, the HE-SIG A 1630 may also include information on a resource (frequency resource (or subband) (when performing transmission based on orthogonal frequency division multiplexing access (OFDMA) or space-time stream resource (when performing transmission based on multiple input multiple output (MIMO)) that is to receive downlink data. As described above, the HE-SIG A 1630 may include information on a downlink resource that is to receive a downlink data frame.

Additionally, the HE-SIG A 1630 may also include color bits information for BSS identification information, bandwidth information, tail bit, CRC bit, modulation and coding scheme (MCS) information on the HE-SIG B 1660, information on the number of symbols for the HE-SIG B 1660, and cyclic prefix (CP) (or guard interval (GI)) length information.

The HE-STF 1640 may be used for enhancing automatic gain control estimation in a MIMO environment or an OFDMA environment.

The HE-LTF 1650 may be used for estimating a channel in a MIMO environment or an OFDMA environment.

The HE-SIG B 1660 may include information on a length modulation and coding scheme (MCS) of a physical layer service data unit (PSDU) for each STA and a tail bit, and so on.

The inverse fast fourier transform (IFFT) size being applied to the HE-STF 1640 and the field after the HE-STF 1640 may be different from the IFFT size being applied to the field before the HE-STF 1640. For example, the IFFT size being applied to the HE-STF 1640 and the field after the HE-STF 1640 may be larger than the IFFT size by an integer multiple (e.g., four times larger than the IFFT size) being applied to the field before the HE-STF 1640. In case the STA receives the PPDU, the STA may decode the HE-SIG A 1630 of the PPDU and may then determine whether or not to perform decoding of the field after the HE-SIG A 1630 based on the identifier information of the target STA included in the HE-SIG A 1630. In this case, in case the identifier information of the target STA included in the HE-SIG A 1630 indicates the identifier of the STA, the STA may perform decoding based on the FFT size, which is changed starting from the HE-STF 1640 and the field after the HE-STF 1640. Conversely, in case the identifier information of the target STA included in the He-SIG A 1630 does not indicate an identifier of the STA, the STA may stop the decoding process and may perform network allocation vector (NAV) configuration. A cyclic prefix (CP) of the HE-STF 1640 may have a size that is larger than the CP of other fields, and, during such CP period, the STA may change the FFT size and may perform decoding on the downlink PPDU.

The order of the fields configuring the format of the PPDU shown in the upper part of FIG. 16 may also be changed. For example, as shown in the middle part of FIG. 16, the HE-SIG B 1615 may be positioned immediately after the HE-SIG A 1605. The STA may perform decoding up to the HE-SIG A 1605 and the HE-SIG B 1615 and may receive the required control information and may then perform NAV configuration. Similarly, the inverse fast fourier transform (IFFT) size being applied to the HE-STF 1625 and the field after the HE-STF 1625 may be different from the IFFT size being applied to the field before the HE-STF 1625.

The STA may receive the HE-SIG A 1605 and the HE-SIG B 1615. In case the reception of the PPDU is indicated by the HE-SIG A 1605, the STA may change the FFT size starting from the HE-STF 1625 and may then perform decoding on the PPDU. Conversely, the STA may receive the HE-SIG A 1605, and, in case the reception of the downlink PPDU is not indicated based on the HE-SIG A 1605, the network allocation vector (NAV) configuration may be performed.

Referring to the lower part of FIG. 16, a DL MU PPDU format/UL MU PPDU format (hereinafter referred to as MU PPDU) for downlink multi-user (DL MU)/UL MU transmission is disclosed. The UL MU PPDU format corresponds to the viewpoint of the AP receiving the UL MU PPDU, which is transmitted from a plurality of STAs. Each of the above described plurality of downlink frames including periodic downlink data being transmitted to each of the plurality of STAs and each of the plurality of uplink frames including periodic uplink data being transmitted by each of the plurality of STAs may be transmitted through the MU PPDU format.

The MU PPDU may be transmitted to the STA or AP through different downlink transmitting resources (frequency resources or space-time streams) or through different uplink transmitting resources (frequency resources or space-time streams). For example, the AP may transmit periodic downlink data (or a periodic downlink frame) to each of the plurality of STAs through a plurality of channels (or sub-bands) based on the DL MU PPDU. The plurality of STAs may transmit periodic uplink data (or a periodic uplink frame) to the AP through a plurality of channels (or sub-bands) based on the UL MU PPDU.

The HE-SIG A 1635 may be transmitted from different transmitting resources in a duplicated form. The HE-SIG B 1645 may be transmitted in an encoded form within the entire transmitting resources. The field after the HE-SIG B 1645 may include separate downlink data for each of the plurality of STAs/separate uplink data being transmitted by each of the plurality of STAs.

In case the fields being included in the MU PPDU are transmitted through each of the transmitting resources, the CRC corresponding to each field may be included in the MU PPDU. Conversely, in case a specific field being included in the MU PPDU is encoded within the entire transmitting resources and then transmitted, the CRC corresponding to each field may not be included in the MU PPDU. Therefore, an overhead corresponding to the CRC may be reduced. More specifically, by using the HE-SIG B 1645 having the encoded format within the entire transmitting resources, the MU PPDU format according to the exemplary embodiment of the present invention may reduce the CRC overhead.

Similarly, in the MU PPDU format, the HE-STF 1655 and the field after the HE-STF 1655 may also be encoded based on an IFFT size that is different from the field before the HE-STF 1655. Therefore, in case the STA receives the HE-SIG A 1635 and the HE-SIG B 1645 and receives an indication on the reception of the PPDU based on the HE-SIG A 1635, the STA may change the FFT size starting from the HE-STF 1655 and may then perform decoding on the MU PPDU.

Figure 17:
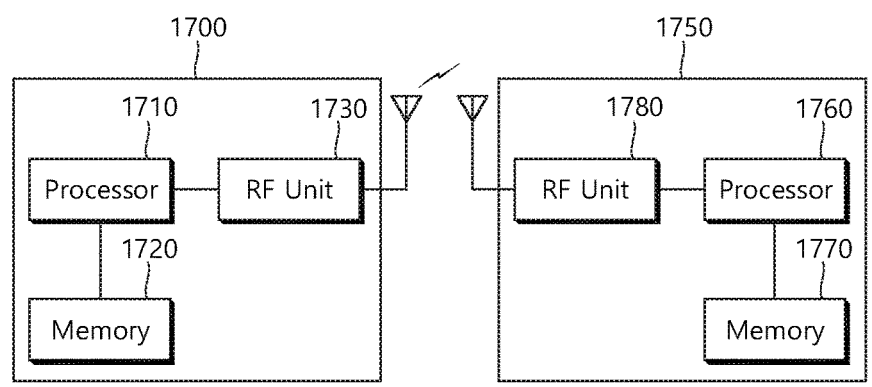
FIG. 17 is a block view illustrating a wireless device to which the exemplary embodiment of the present invention can be applied.

FIG. 17 is a block view illustrating a wireless device to which the exemplary embodiment of the present invention can be applied.

Referring to FIG. 17, as an STA that can implement the above-described exemplary embodiment, the wireless device 1700 may correspond to an AP 1700 or a non-AP station (STA) 1750.

The AP 1700 includes a processor 1710, a memory 1720, and a radio frequency (RF) unit 1730.

The RF unit 1730 is connected to the processor 1710, thereby being capable of transmitting and/or receiving radio signals.

The processor 1710 implements the functions, processes, and/or methods proposed in the present invention. For example, the processor 1710 may be implemented to perform the operations of the wireless device according to the above-described exemplary embodiments of the present invention. The processor may perform the operations of the wireless device, which are disclosed in the exemplary embodiments of FIG. 1 to FIG. 16.

For example, the processor 1710 may be configured to receive each of the plurality of uplink frames including a periodic uplink/downlink transmission field from each of the plurality of STAs, to determine a downlink resource for each of the plurality of periodic downlink frames that are to be transmitted to each of the plurality of STAs and an uplink resource for each of the plurality of periodic uplink frames that are to be transmitted from each of the plurality of STAs, and to transmit a MU scheduling frame including information on downlink resources and information on uplink resources to each of the plurality of STAs. Additionally, the processor 1710 may be configured to transmit each of a plurality of periodic downlink frames to each of the plurality of STAs through the downlink resource within an overlapping time resource and to receive each of a plurality of periodic uplink frames from each of the plurality of STAs through the uplink resource within an overlapping time resource. The periodic uplink/downlink transmission field may include information requesting the transmission of periodic uplink data and the reception of periodic downlink data.

The MU scheduling frame may include a service interval field, and the service interval field may include information on a duration for the reception of each of the plurality of periodic downlink frames and the transmission of each of the plurality of periodic uplink frames based on the MU scheduling frame. In case the procedures for the reception of each of the plurality of periodic downlink frames and the transmission of each of the plurality of periodic uplink frames are terminated, each of the plurality of STAs may be shifted from the awake state to the doze state, so as to maintain the doze state until the ending point of the duration.

Additionally, the MU scheduling frame may include a service start time field, and the service start time field may include time information on the time for receiving each of the plurality of periodic downlink frames.

The STA 1750 includes a processor 1760, a memory 1770, and a radio frequency (RF) unit 1780.

The RF unit 1780 is connected to the processor 1760, thereby being capable of transmitting and/or receiving radio signals.

The processor 1760 implements the functions, processes, and/or methods proposed in the present invention. For example, the processor 1760 may be implemented to perform the operations of the wireless device according to the above-described exemplary embodiments of the present invention. The processor may perform the operations of the wireless device, which are disclosed in the exemplary embodiments of FIG. 1 to FIG. 16.

For example, the processor 1760 may be configured to transmit each of a plurality of uplink frames including a periodic uplink/downlink transmission field (or periodic uplink transmission field/periodic downlink transmission field). Additionally, the processor 1760 may be configured to receive a multi-user (MU) scheduling frame including information on downlink resources for each of the plurality of periodic downlink frames that are to be transmitted to each of the plurality of STAs and information uplink resources for each of the plurality of periodic uplink frames that are to be transmitted by each of the plurality of STAs. Moreover, the processor 1760 may be configured to transmit periodic downlink frames to the AP through allocated downlink resources and to transmit periodic uplink frames to the AP through allocated uplink resources.

The processor 1710 and 1760 may include an application-specific integrated circuit (ASIC), another chip set, a logical circuit, a data processing device, and/or a converter converting a baseband signal and a radio signal to and from one another. The memory 1720 and 1770 may include a read-only memory (ROM), a random access memory (RAM), a flash memory, a memory card, a storage medium, and/or another storage device. The RF unit 1730 and 1780 may include one or more antennas transmitting and/or receiving radio signals.

When the exemplary embodiment is implemented as software, the above-described method may be implemented as a module (process, function, and so on) performing the above-described functions. The module may be stored in the memory 1720 and 1770 and may be executed by the processor 1710 and 1760. The memory 1720 and 1770 may be located inside or outside of the processor 1710 and 1760 and may be connected to the processor 1710 and 1760 through a diversity of well-known means.

What is claimed is:

1. A method for transmitting and receiving periodic data in a wireless LAN, comprising:
   receiving, by an access point (AP), each of a plurality of uplink frames including a periodic uplink/downlink transmission field from each of a plurality of stations (STAs);
   determining, by the AP, a downlink resource for each of a plurality of periodic downlink frames that are to be transmitted to each of the plurality of STAs and an uplink resource for each of a plurality of periodic uplink frames that are to be transmitted by each of the plurality of STAs;
   transmitting, by the AP, a multi-user (MU) scheduling frame including information on the downlink resource and information for the uplink resource;
   transmitting, by the AP, each of the plurality of periodic downlink frames to each of the plurality of STAs through the downlink resources based on the MU scheduling frame within an overlapping time resource; and
   receiving, by the AP, each of the plurality of periodic uplink frames from each of the plurality of STAs through the uplink resources based on the MU scheduling frame within an overlapping time resource,
   wherein the periodic uplink/downlink transmission field includes information requesting transmission of periodic uplink data and reception of periodic downlink data.

2. The method of claim 1, wherein the MU scheduling frame includes a service interval field,
   wherein the service interval field includes information on a duration for the reception of each of the plurality of periodic downlink frames and the transmission of each of the plurality of periodic uplink frames based on the MU scheduling frame, and
   wherein, in case procedures for the reception of each of the plurality of periodic downlink frames and the transmission of each of the plurality of periodic uplink frames are terminated, each of the plurality of STAs are shifted from an awake state to a doze state and maintained in the doze state until an ending time of the duration.

3. The method of claim 1, wherein the MU scheduling frame includes a service start time field, and wherein the service start time field includes time information for the reception of each of the plurality of periodic downlink frames.

4. The method of claim 1, further comprising:
excluding, by the AP, one STA from an uplink (UL) MU scheduling list, in case the AP receives a silence indication through one periodic uplink frame, among the plurality of periodic uplink frames being transmitted from the one STA, among the plurality of STAs,
wherein the silence indication includes information indicating a non-existence of an additional periodic uplink frame of the one STA, and
wherein the UL MU scheduling list includes information on at least one STA requesting allocation of an uplink resource for the transmission a periodic uplink frame.

5. The method of claim 1, further comprising:
excluding, by the AP, one STA from a MU scheduling list, in case the AP receives a MU transmission termination request field through one periodic uplink frame, among the plurality of periodic uplink frames being transmitted from the one STA, among the plurality of STAs,
wherein the MU transmission termination request field includes information indicating a non-existence of an additional periodic uplink frame and a non-existence of an additional periodic downlink frame, and
wherein the MU scheduling list includes information on at least one STA requesting allocation of an uplink resource for a periodic uplink frame and allocation of a downlink resource for a periodic downlink frame.

6. An access point (AP) transmitting and receiving periodic data in a wireless LAN, comprising:
a radio frequency (RF) unit configured to transmit or receive radio signal; and
a processor operatively connected to the RF unit,
wherein the processor is configured:
to receive each of a plurality of uplink frames including a periodic uplink/downlink transmission field from each of a plurality of stations (STAs),
to determine a downlink resource for each of a plurality of periodic downlink frames that are to be transmitted to each of the plurality of STAs and an uplink resource for each of a plurality of periodic uplink frames that are to be transmitted by each of the plurality of STAs,
to transmit multi-user (MU) scheduling frame including information on the downlink resource and information for the uplink resource,
to transmit each of the plurality of periodic downlink frames to each of the plurality of STAs through the downlink resources based on the MU scheduling frame within an overlapping time resource, and
to receive each of the plurality of periodic uplink frames from each of the plurality of STAs through the uplink resources based on the MU scheduling frame within an overlapping time resource, wherein the periodic uplink/downlink transmission field includes information requesting transmission of periodic uplink data and reception of periodic downlink data.

7. The AP of claim 6, wherein the MU scheduling frame includes a service interval field,
wherein the service interval field includes information on a duration for the reception of each of the plurality of periodic downlink frames and the transmission of each of the plurality of periodic uplink frames based on the MU scheduling frame, and
wherein, in case procedures for the reception of each of the plurality of periodic downlink frames and the transmission of each of the plurality of periodic uplink frames are terminated, each of the plurality of STAs are shifted from an awake state to a doze state and maintained in the doze state until an ending time of the duration.

8. The AP of claim 6, wherein the MU scheduling frame includes a service start time field, and
wherein the service start time field includes time information for the reception of each of the plurality of periodic downlink frames.

9. The AP of claim 6, wherein the processor is configured to exclude one STA from an uplink (UL) MU scheduling list, in case the AP receives a silence indication through one periodic uplink frame, among the plurality of periodic uplink frames being transmitted from the one STA, among the plurality of STAs,
wherein the silence indication includes information indicating a non-existence of an additional periodic uplink frame of the one STA, and
wherein the UL MU scheduling list includes information on at least one STA requesting allocation of an uplink resource for the transmission a periodic uplink frame.

10. The AP of claim 6, wherein the processor is further configured to exclude one STA from a MU scheduling list, in case the AP receives a MU transmission termination request field through one periodic uplink frame, among the plurality of periodic uplink frames being transmitted from the one STA, among the plurality of STAs,
wherein the MU transmission termination request field includes information indicating a non-existence of an additional periodic uplink frame and a non-existence of an additional periodic downlink frame, and
wherein the MU scheduling list includes information on at least one STA requesting allocation of an uplink resource for a periodic uplink frame and allocation of a downlink resource for a periodic downlink frame.

* * * * *